(12) United States Patent
Okada

(10) Patent No.: US 6,170,773 B1
(45) Date of Patent: Jan. 9, 2001

(54) SPINNING REEL HAVING A UNIFORM LONGITUDINAL SPOOL MOVEMENT

(75) Inventor: Atsuhito Okada, Fuchu (JP)

(73) Assignee: Ryobi Limited, Tokyo (JP)

(*) Notice: Under 35 U.S.C. 154(b), the term of this patent shall be extended for 0 days.

(21) Appl. No.: 09/282,737

(22) Filed: Mar. 31, 1999

Related U.S. Application Data

(62) Division of application No. 08/791,480, filed on Jan. 27, 1997, now Pat. No. 6,000,653.

(30) Foreign Application Priority Data

Jan. 31, 1996 (JP) .......................................... 8-15914
Apr. 26, 1996 (JP) .......................................... 8-131218

(51) Int. Cl.[7] ................................................ A01K 89/01
(52) U.S. Cl. ................................................... 242/242
(58) Field of Search ..................................... 242/242, 241

(56) References Cited

U.S. PATENT DOCUMENTS

| | | |
|---|---|---|
| 3,367,597 | 2/1968 | Morritt . |
| 3,436,033 | 4/1969 | Murvall . |
| 4,026,493 | 5/1977 | Anderson . |
| 4,927,094 | 5/1990 | Henriksson . |
| 5,012,990 | 5/1991 | Kawabe . |
| 5,350,131 | 9/1994 | Baumgarner et al. . |
| 5,513,814 | 5/1996 | Zanon . |
| 6,000,653 | * 12/1999 | Okada ................................. 242/242 |

* cited by examiner

Primary Examiner—Katherine A. Matecki
(74) Attorney, Agent, or Firm—Brooks & Kushman P.C.

(57) ABSTRACT

A spinning reel comprises a reel body casing, a rotational frame member rotatably provided for the reel body casing, a spool shaft provided for the reel body casing to be movable in a rotation axis direction of the rotational frame member, a spool mounted to one end portion of the spool shaft, a handle lever operatively connected to the rotational frame member capable of rotating the same, an oscillator secured to another end portion of the spool shaft, an oscillator gear provided for the reel body casing to be rotated by the handle lever and a rotational member mounted to the oscillator gear to be rotatable. The rotational member is formed with a first projection engageable with a cam groove formed to an inner surface of the reel body casing and a second projection engageable with the oscillator.

4 Claims, 38 Drawing Sheets

SPINNING REEL HAVING A UNIFORM LONGITUDINAL SPOOL MOVEMENT

This is a divisional of application Ser. No. 08/791,480 filed on Jan. 27, 1997, now U.S. Pat. No. 6,000,653.

BACKGROUND OF THE INVENTION

The present invention relates to a spinning reel, particularly for a fishing reel, provided with a mechanism smoothly movable or slidable in an axial direction of a spool shaft.

In general, there is widely known a spinning reel for winding up a fishing line by rotating a rotational frame of the reel and moving a spool reciprocally in a rotation axis direction of the rotational frame.

FIG. 53 shows one example of a conventional spinning reel, in which reference numeral 201 denotes a body casing, i.e. reel body, and a handle shaft 202 is mounted to the body casing 201 to be rotatable. A coupling gear 203 is secured to the handle shaft 202, and the coupling gear 203 is engaged with an oscillator gear 204 rotatably mounted to the body casing 201. A pin 205 engaged with a slot 206a formed to an oscillator 206 is provided for the oscillator gear 204. Secured to the oscillator 206 is a spool shaft 208 having a front end to which a spool 208 is mounted.

When the spinning reel of the structure described above is operated by gripping and rotating a handle lever 209 to rotate the handle shaft 202, the coupling gear 203 mounted to the handle shaft 202 is also rotated, thus the oscillator gear 204 being rotated, thereby moving the pin 205 along the slot 206a. In this manner, the oscillator 206 and, hence, the spool shaft 207 is moved reciprocally in a longitudinal direction, i.e. bilateral direction in FIG. 53.

However, according to the above prior art structure, the spool shaft does not perform a uniform reciprocal motion and, under such state, when the fishing line is wound up, the fishing line is not uniformly wound up around the spool and will be relaxed as shown in FIG. 54.

In order to obviate such defect, a prior art further provides a structure for making almost uniform the reciprocal motion of the spool shaft such as disclosed in the Japanese Patent Publication No. HEI 2-60295.

FIG. 55 shows a structure of a spinning reel of this publication, in which reference numeral 301 denotes a body casing to which a handle shaft 302 is mounted to be rotatable. Secured to the handle shaft 302 is a coupling gear 303 which is engaged with an oscillator gear 304 mounted to the body casing 301 to be rotatable. The oscillator gear 304 is formed with a slot 304a extending in the radial direction thereof, and a follow-up pin 305 penetrates the slot 304a. The follow-up pin 305 has one end engaged with a cam groove 301a formed to the body casing 301 and has another one end engaged with a slot 306a of an oscillator 306. A spool 308 is mounted to one end of a spool shaft 307. The cam groove 301a as a shape enabling the spool 308 to perform almost uniform motion.

When the handle shaft 302 is driven and rotated by a handle lever 309, the coupling gear 303 is rotated and hence the oscillator gear 304 is also rotated. Upon the rotation of the oscillator gear 304, the follow-up pin 305 penetrating the slot 304a moves along the cam groove 301a and the slot 306a. In this manner, the oscillator 306 and the spool 308 is moved reciprocally in the bilateral direction as viewed in FIG. 54 at substantially the uniform motion speed.

Furthermore, it has been considered that a clearance having a proper gap is made between the follow-up pin 305 and the cam groove 301a.

However, even in the above structure, there is provided the following problems. That is, according to the above structure, since the follow-up pin 305 inclines during its movement, the spool is not moved smoothly. The inclining motion of the follow-up pin 305 will cause wearing of the slots, the cam groove and the follow-up pin itself, thus being not advantageous. Furthermore, when an impact is applied in the spool axis direction by a falling down shock of the spinning reel, for example, the slots, the cam groove and the follow-up pin will easily damaged, also providing a problem. The inclining motion of the follow-up pin 305 will not cause a smooth rotation of the rotational frame of the spinning reel. Still furthermore, since the follow pin 305 has to be disposed inside tooth bottom of the oscillator gear 306, it is difficult to make large strokes of the oscillator and the spool.

In the arrangement provided with the clearance mentioned above, the axial movement of the spool shaft is not stable, and an undesired backlash may be caused during the movement between the spool and the reel body, also providing a problem.

SUMMARY OF THE INVENTION

An object of the present invention is to substantially eliminate defects or drawbacks encountered in the prior art described above and to provide a spinning reel, particularly for fishing, capable of performing a uniform and smooth motion of a spool of the spinning reel in its longitudinal direction and being improved in its durability.

This and other objects can be achieved according to the present invention by providing, in one aspect, a spinning reel comprising:

a reel body casing;

a rotational frame member rotatably provided for the reel body casing;

a spool shaft provided for the reel body casing to be movable in a rotation axis direction of the rotational frame member;

a spool mounted to one end portion of the spool shaft;

a handle means operatively connected to the rotational frame member capable of rotating the same;

an oscillator means secured to another end portion of the spool shaft;

an oscillator gear provided for the reel body casing to be rotatable by the handle means; and a rotational member mounted to the oscillator gear to be rotatable, the rotational member being formed with a first projection engageable with a cam groove formed to an inner surface of the reel body casing and a second projection engageable with the oscillator means.

In preferred examples in this aspect, the first and second projections are formed on opposing surfaces of the rotational member, respectively, shifted in angles from each other.

The oscillator means is provided with a slot with which the second projection is engageable. The oscillator gear and the rotational member is operatively connected through a link mechanism. The oscillator gear is mounted to an oscillator gear shaft secured to the reel body casing, the oscillator gear shaft being provided with a flanged portion in a direction perpendicular to an axial direction of the oscillator gear shaft.

The rotational member is provided with a body portion and a flanged portion, and the first projection is formed to and flanged portion. The flanged portion is engageable with a recessed portion formed to the oscillator gear. A plate member is secured to the rotational member for preventing the rotational member from falling down from the oscillator gear. The plate member may be secured to the oscillator gear for preventing the rotational member from falling down from the oscillator gear.

A plate member having a diameter larger than that of the body portion of the rotational member is secured thereto and the plate member is positioned in the recessed portion of the oscillator gear.

A reel body casing is integrally formed with a boss portion to which the oscillator gear is rotatably mounted and a metallic pin is fitted to the boss portion, and the reel casing body is formed of a resin material.

At least one of the first and second projections has a portion positioned outwardly apart from a tooth bottom circle of the oscillator gear.

In another aspect of the present invention, there is provided a spinning reel comprising:
- a reel body casing;
- a rotational frame member rotatably provided for the reel body casing;
- a spool shaft provided for the reel body casing to be movable in a rotation axis direction of the rotational frame member;
- a spool mounted to one end portion of the spool shaft;
- a handle means operatively connected to the rotational frame member capable of rotating the same;
- an oscillator means secured to another end portion of the spool shaft;
- an oscillator gear provided for the reel body casing to be rotatable and operatively coupled with the handle means, the oscillator gear being formed with a slot extending in a diameter directional of the oscillator gear, the reel body casing having a side wall facing the oscillator gear to which a cam groove having substantially elliptical shape in a spool shaft sliding direction is formed;
- a pin member slidably penetrating the slot and having one end engaged with the cam groove and another end engaged with a vertical groove formed to the oscillator means; and
- a rotational plate member disposed to be rotatable with respect to the oscillator gear together therewith and to be slidable in the extending direction of the slot, the rotational plate member being provided with both side surfaces to which the one and another ends of the pin member are mounted.

In preferred embodiments of this aspect, the another end of the pin member mounted to the rotational plate member is coupled with the oscillator means through a link member.

A link member is provided for either one of the another end of the pin member, the oscillator means and the reel body casing to be swingable and the other two of the another end of the pin member, the oscillator means and the reel body casing are coupled together through a slot formed to the link member.

The another end of the pin member engaged with the oscillator means or a link member is displaced in a diameter direction of the oscillator gear with respect to the one end of the pin member engaged with the cam groove. The another end of the pin member engaged with the oscillator means or a link member is displaced in a circumferential direction of the oscillator gear with respect to the one end of the pin member engaged with the cam groove and the elliptical cam groove is formed in a direction crossing to the sliding direction of the spool shaft. The another end of the pin member engaged with the oscillator means or a link member is displaced by an angle of substantially 90° in a circumferential direction of the oscillator gear with respect to the one end of the pin member engaged with the cam groove and the elliptical cam groove is formed such that a long diameter portion crosses at an angle of 45° and a short diameter portion crosses at an angle of 135° both with respect to the sliding direction of the spool shaft.

In a further aspect of the present invention, there is provided a spinning reel comprising:
- a reel body casing;
- a rotational frame member rotatably provided for the reel body casing;
- a spool shaft provided for the reel body casing to be movable in a rotation axis direction of the rotational frame member;
- a spool mounted to one end portion of the spool shaft;
- a handle means operatively connected to the rotational frame member capable of rotating the same;
- an oscillator means secured to another end portion of the spool shaft and formed with a guide groove;
- an oscillator gear provided for the reel body casing to be rotatable by the handle means;
- a rotational member mounted to the oscillator gear to be rotatable through the rotation of the oscillator gear;
- a first projection formed to the rotational member to be engageable with a cam groove formed to an inner surface of the reel body casing;
- a second projection formed to the rotational member to be engageable with the guide groove formed to the oscillator means; and
- a cylindrical member mounted to an outer periphery of at least one of the first and second projections, the cylindrical member being formed of a material softer than a material forming the reel body casing or oscillator means to which the cylindrical member is directly contacted.

The cylindrical member is mounted to at least one of the first and second projections to be rotatable.

In a still further aspect of the present invention, there is provided a spinning reel comprising:
- a reel body casing formed with a guide groove;
- a rotational frame member rotatably provided for the reel body casing;
- a stool shaft provided for the reel body casing to be movable in a rotation axis direction of the rotational frame member;
- a spool mounted to one end portion of the spool shaft;
- a handle means operatively connected to the rotational frame member capable of rotating the same;
- an oscillator means secured to another end portion of the spool shaft;
- an oscillator gear provided for the reel body casing to be rotatable by the handle means;
- a rotational member mounted to the oscillator gear to be rotatable through the rotation of the oscillator gear;
- a first projection formed to the rotational member to be engageable with a cam groove formed to an inner surface of the reel body casing;
- a link member disposed between the oscillator means and the rotational member;
- a second projection formed to the oscillator means to be engageable with the guide groove formed to the reel body casing;

a cylindrical member mounted to an outer periphery of at least one of said first and second projections, the cylindrical member being formed of a material softer than a material forming the reel body casing.

The cylindrical member is mounted to at least one of the first and second projections to be rotatable.

In a still further aspect of the present invention, there is provided a spinning reel comprising:

a reel body casing;

a rotational frame member rotatably provided for the reel body casing;

a spool shaft provided for the reel body casing to be movable in a rotation axis direction of the rotational frame member;

a spool mounted to one end portion of the spool shaft;

a handle means operatively connected to the rotational frame member capable of rotating the same;

an oscillator means secured to another end portion of the spool shaft and formed with a guide groove;

an oscillator gear provided for the reel body casing to be rotatable by the handle means;

a rotational member mounted to the oscillator gear to be rotatable through the rotation of the oscillator gear;

a first projection formed to the rotational member to be engageable with a cam groove formed to an inner surface of the reel body casing;

a second projection formed to the rotational member to be engageable with the guide groove formed to the oscillator means; and a ball bearing means mounted to an outer periphery of at least either one of the first and second projections.

In a still further aspect of the present invention, there is provided a spinning reel comprising:

a reel body casing formed with a guide groove;

a rotational frame member rotatably provided for the reel body casing;

a spool shaft provided for the reel body casing to be movable in a rotation axis direction of the rotational frame member;

a spool mounted to one end portion of the spool shaft;

a handle means operatively connected to the rotational frame member capable of rotating the same;

an oscillator means secured to another end portion of the spool shaft;

an oscillator gear provided for the reel body casing to be rotatable by the handle means;

a rotational member mounted to the oscillator gear to be rotatable through the rotation of the oscillator gear;

a first projection formed to the rotational member to be engageable with a cam groove formed to an inner surface of the reel body casing;

a link member disposed between the rotational member and the oscillator means;

a second projection formed to the oscillator means to be engageable with the guide groove formed to the reel body casing; and a ball bearing means mounted to an outer periphery of at least either one of said first and second projections.

According to the characters or structures of the present invention described above, in one aspect, when the handle lever is rotated, the oscillator gear is then rotated and the rotational member is hence rotated about the rotation center of the oscillator gear. Through this rotation, since the second projection is engaged with the slot of the oscillator means, the oscillator is reciprocally moved. According to this reciprocal motion of the oscillator, the spool shaft mounted with the spool at its one end is also reciprocally moved along its axial direction. The first projection of the rotational member is engaged with the cam groove, so that the revolution of the rotational member is itself limited, thereby performing the uniform reciprocal motion of the oscillator, and the fishing line, for example, can be uniformly wound up around the spool.

Accordingly, since the rotation of the oscillator gear is transferred to the oscillator through the projection formed to the rotational member, the rotational member is not inclined, thus reducing the backlash thereof during the axial movement of the spool and smoothly rotating the rotational frame of the reel body casing. Furthermore, since the respective members or elements are always engaged with each other in normal places, the wearing of these members can be effectively eliminated, thus improving the durability of the spinning reel. The formation of the flanged portion contributes the angular accuracy of the oscillator gear shaft. The strength of the oscillator gear shaft, and hence, the durability thereof, may be improved by forming the oscillator gear shaft with a material different from that of the reel body casing. The rotational member can be prevented from falling down from the oscillator gear and the backlash thereof can be also prevented effectively.

According to the structure of the embodiments in another aspect of the present invention, since the pin for operatively coupling the oscillator to the oscillator gear is provided for the rotational plate member and the rotational plate member is disposed in an overlapped manner to the oscillator gear, the pin is hardly inclined to thereby perform a smooth movement of the transfer mechanism from the oscillator gear to the oscillator and the spool is also swung smoothly in the longitudinal direction thereof with no backlash, thus exactly winding up a fishing line. Furthermore, even in a case where a large force is applied to the pin through the spool shaft due to an impact load applied, for example, through the falling down of the reel, the reel is hardly damaged because the pin is fixed to the rotational plate member.

Furthermore, in the preferred embodiments, the another end of the pin formed to the rotational plate member is coupled to the oscillator through the link, the arrangements and shapes of the rotational plate member, the cam groove, oscillator, etc. with respect to the reel body casing can be relatively freely designed, making small and compact the structure of the reel itself. Moreover, the driving force transfer resistance of the another end of the pin to the oscillator can be reduced and, hence, the spool can be smoothly slid with light load.

Furthermore, since the link member is provided for either one of the another end of the pin, the oscillator and the reel body casing to be swingable and the other two of the another end of the pin, the oscillator and the reel body casing are coupled together through a slot formed to the link member, the coupling between the another end of the pin, the oscillator and the reel body casing can be easily changed, whereby the sliding motion amount of the oscillator with respect to the elliptical motion of the another end of the pin can be increased or decreased as occasion demands and the oscillating amount can be thus adjusted in accordance with the shape of the bobbin winder shell of the spool. Moreover, since the shape and inclination of the slot as the coupling portion can be optionally changed, the sliding speed of the oscillator can be partially changed or adjusted.

Still furthermore, since the pin has a structure such that the another end thereof engaged with the vertical groove is displaced in the diameter direction of the oscillator gear with respect to the one end of the pin and the displacing direction and distance can be adjusted, the sliding motion amount of the spool in accordance with the width of the bobbin winder shell of the spool. Moreover, since the sliding motion amount of the spool of the length longer than the diameter of the oscillator gear can be ensured by displacing the another end of the pin by an amount larger than the long diameter of the cam groove, a large sliding motion amount can be obtained by the oscillator gear having a small diameter and the cam groove, thus making compact and simple of the structure of the reel body casing.

Still furthermore, since the another end of the pin engaged with the oscillator link is displaced in a circumferential direction of the oscillator gear with respect to the one end of the pin engaged with the cam groove and the elliptical cam groove is formed in a direction crossing to the sliding direction of the spool shaft, it is not necessary to always accord the direction of the cam groove with the spool shaft extending direction, thus improving the freedom for designing the shape of the reel body casing and the arrangements of other members. Furthermore, since the oscillator gear is disposed near the handle lever, the reel body casing is made compact and simple in structure. The moving motion amount of the another end of the pin per the rotational angle of the rotational plate member, i.e. the spool sliding motion amount, can be adjusted by adjusting the displacement amount and the displacement direction in the circumferential direction of the another end of the pin with respect to the one end thereof engaged with the cam groove. Accordingly, by adjusting the displacement amount, the ratio between the long and short diameters of the cam groove can be adjusted and the cam groove can be formed so as to provide an elliptical shape, near circular shape, of the cam groove, or an elliptical shape having extreme small diameter, thus reducing the driving force transfer resistance to the one end of the pin and preventing the cam groove and the one end of the pin from being worn and damaged, resulting in the smooth sliding motion of the spool with less load.

Still furthermore, since the pin is formed such that the one end of the pin engaged with the cam groove is displaced by an angle of substantially 90° in a circumferential direction of the oscillator gear with respect to the another end of the pin engaged with the vertical groove and the elliptical cam groove is formed such that a long diameter portion crosses at an angle of 45° and a short diameter portion crosses at an angle of 135° both with respect to the sliding direction of the spool shaft, the sliding motion amount with respect to the rotational angle at the time of converting the circular motion to the sliding motion can be adjusted, the desired constant velocity sliding motion can be realized, thus achieving a uniform winding up of the fishing line around the spool of the reel.

According to the further and still further aspects of the embodiments of the present invention described above, the fishing line can be smoothly wound up with reduced friction resistance. Since the cylindrical member is first worn, the wearing of the groove formed to the oscillator or the reel body casing can be reduced, preventing the backlash due to the axial movement of the spool, thus improving the durability of the spinning reel itself. Furthermore, since vibration caused by a minute backlash in the oscillator mechanism can be absorbed by the cylindrical member, the rotation can be made smooth. The cylindrical member will effectively absorb an impact load in a case of falling down of the reel to thereby prevent the cam groove of the reel body casing and the groove of the oscillator from being damaged, thus maintaining the smooth rotating moton of the reel. Still furthermore, because the cylindrical member is first damaged in an adverse case before the damaging of the cam groove of the reel body casing and the groove of the oscillator, the repairing can be made easily only by changing the cylindrical member. Since the cylindrical member is made to be rotatable, the fishing line can be smoothly wound up with reduced wearing of the cylindrical member. In the use of the ball bearing as the cylindrical member, the backlash mentioned above can be further reduced, resulting in the reduction of the backlash of the spool in the axial direction thereof. The durability of the spinning reel can be also improved.

The nature and further characters and features of the present invention will be made more clear from the following descriptions made with reference to the accompanying drawings.

DESCRIPTION OF THE PREFERRED EMBODIMENTS

A first embodiment of the present invention will be described hereunder with reference to the accompanying drawings.

Figure 1:
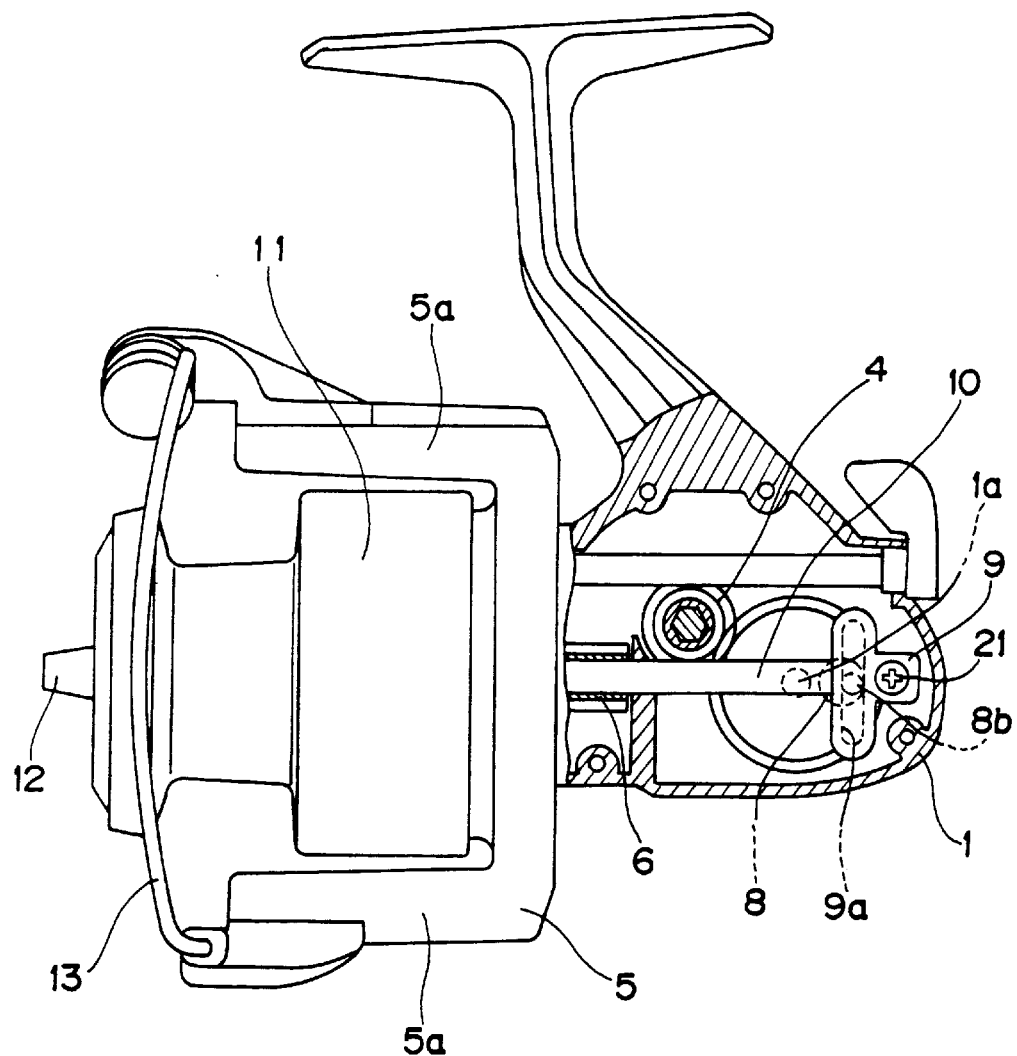
FIG. 1 is a front view, partially in section, of a spinning reel of a first embodiment according to the present invention.
Figure 2:
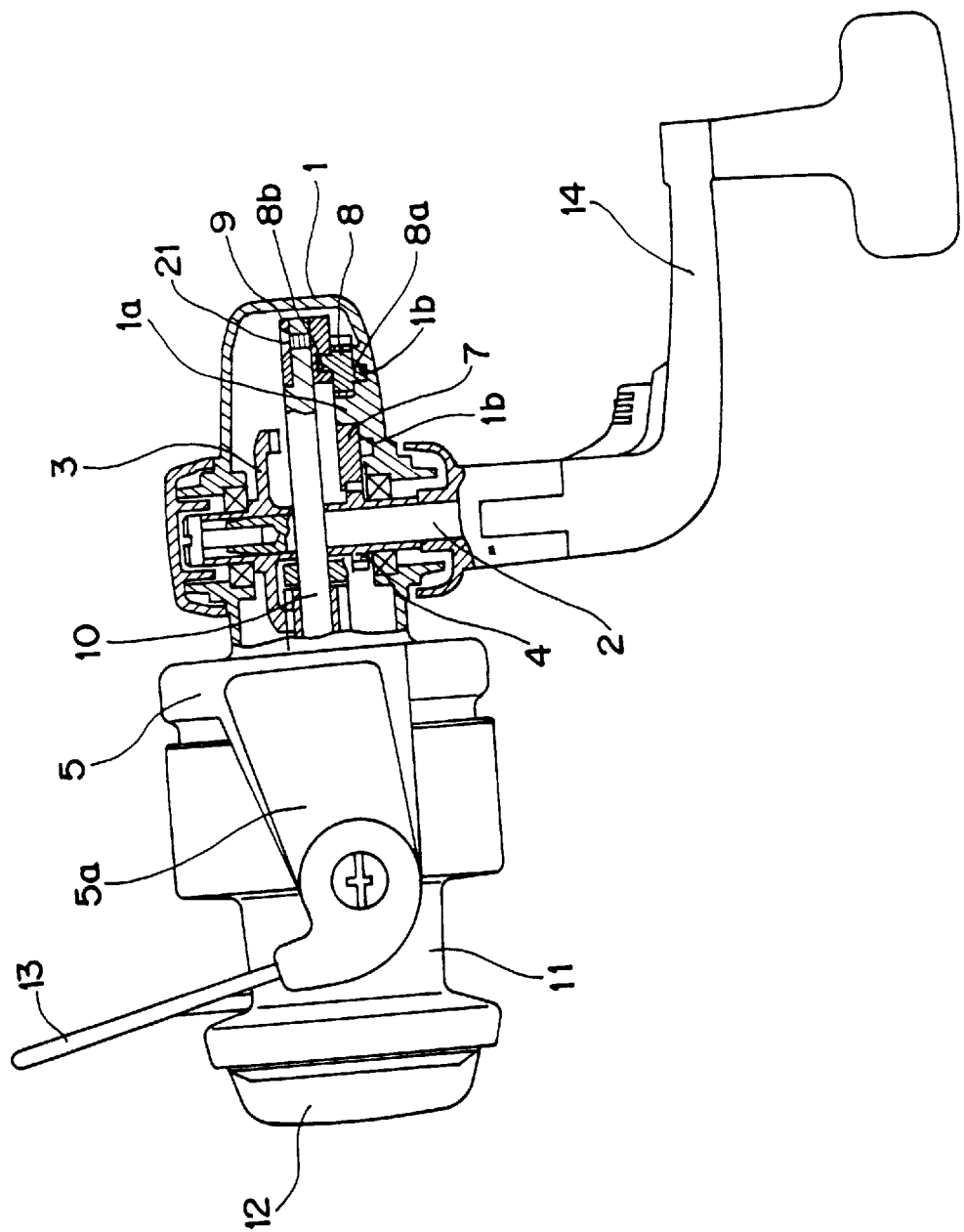
FIG. 2 is a bottom view of the spinning reel shown in FIG. 1.
Figure 3:
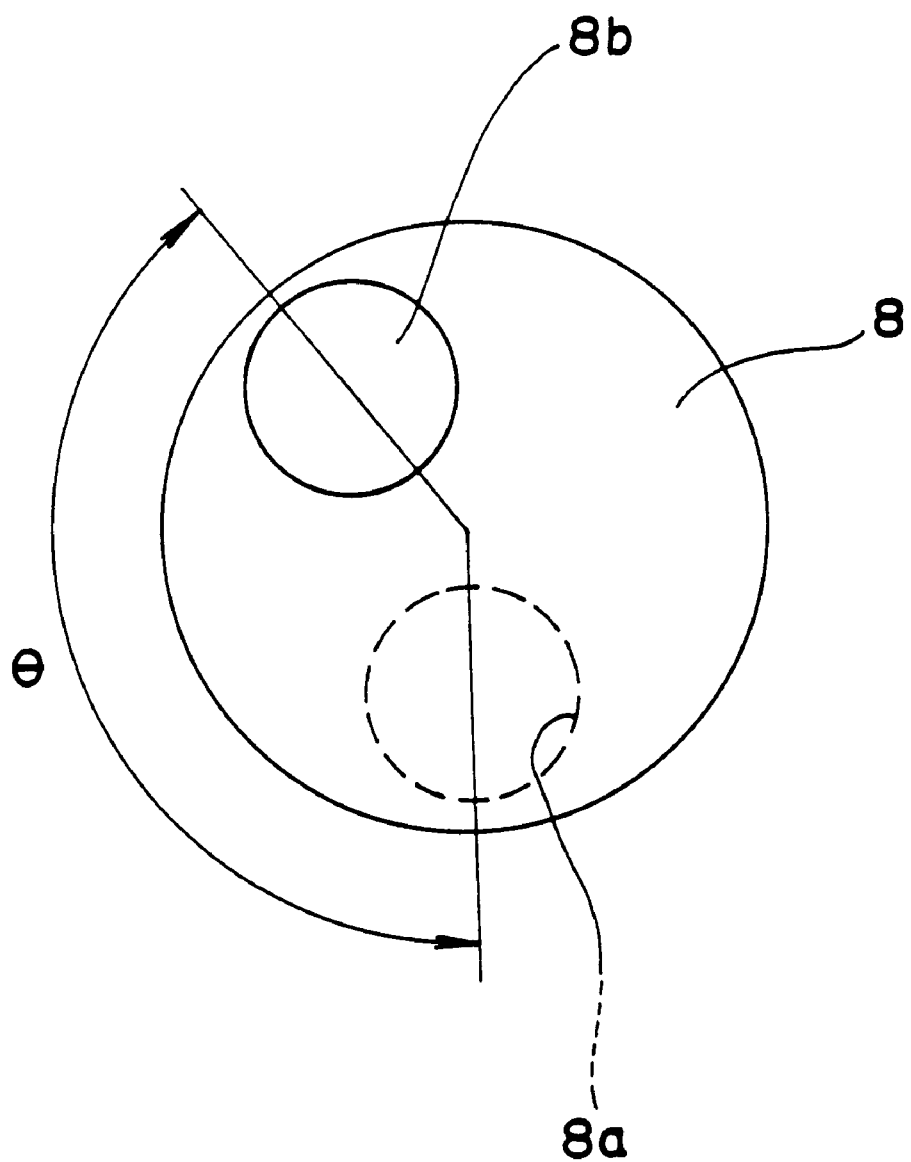
FIG. 3 is a schematic plan view of a rotational member for the spinning reel of FIG. 1.
Figure 4:
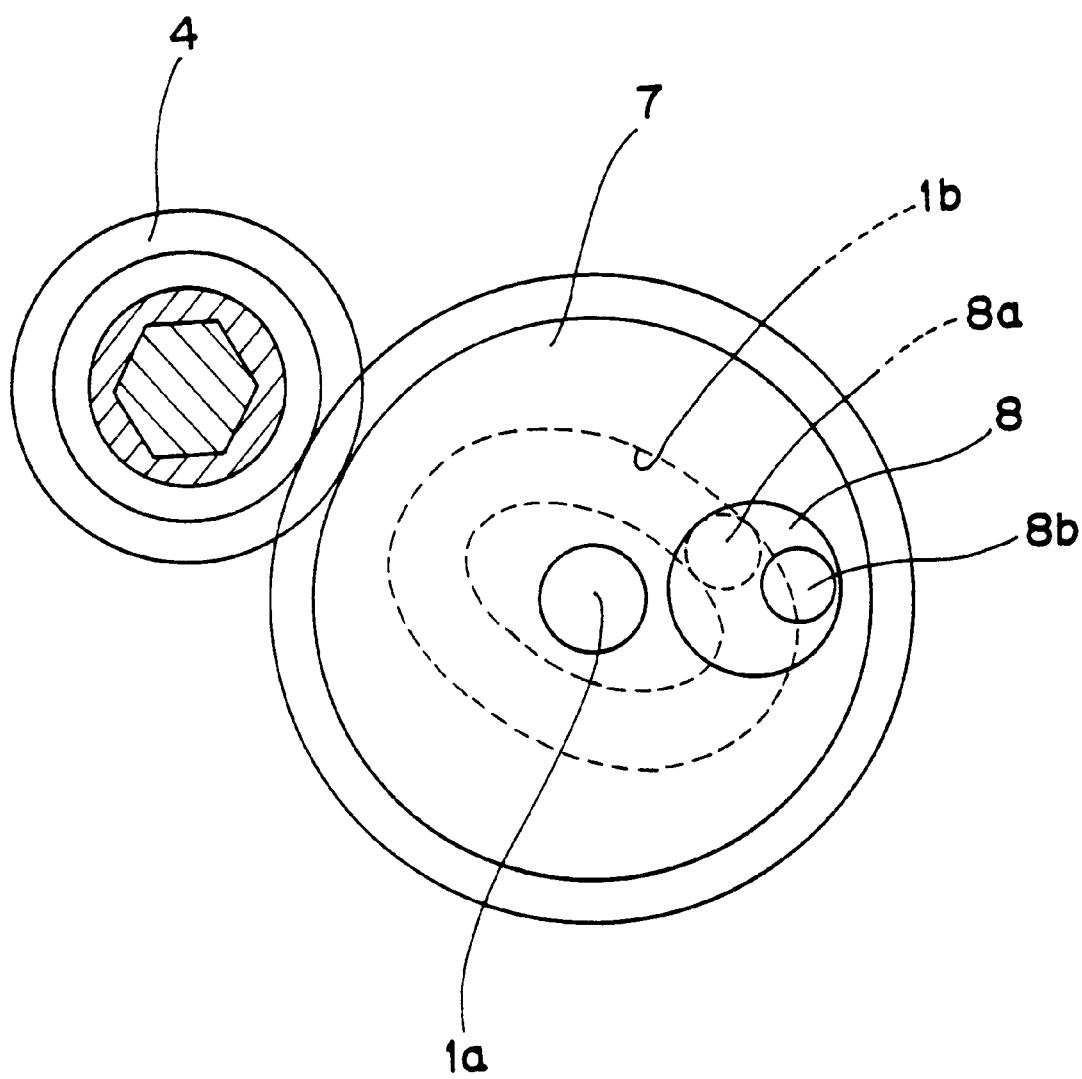
FIG. 4 is a schematic plan view of an oscillator gear of the spinning reel of FIG. 1.

Referring to FIGS. 1 and 2, reference numeral 1 denotes a body casing or reel body of a spinning reel and a handle shaft 2 is mounted inside the body casing 1 to be rotatable. A master gear 3 and a coupling gear 4 are mounted to the handle shaft 2. The master gear 3 is meshed with a pinion 6 connected to a rotational frame 5 of the spinning reel so that the rotational frame 5 becomes rotatable through the rotation of the master gear 3, and the coupling gear 4 is meshed with an oscillator gear 7 held rotatably to a boss portion 1a formed to an inner wall portion of the body casing 1. A rotational member 8, generally in shape of plate, is provided for the oscillator gear 7 to be rotatable, the rotational member 8 having one surface facing the body casing 1 to which a first projection 8a is formed and another one surface to which a second projection 8b is formed with a state shifted from the first projection 8a by an angle θ as shown in FIG. 3. With reference to FIG. 4, the first projection 8a is engaged with a cam groove 1b formed to the inner wall portion of the body casing 1, and as also shown in FIG. 1, the second projection 8b is engaged with a slot 9a formed to an oscillator 7 to be slidable therealong.

As shown, the oscillator 9 is fixed to one end of the spool shaft 10 by means of a screw 21 and a spool 11 is secured to the other end of the spool shaft 10 by means of a drag knob 12. The rotational frame 5 is provided with arm portions 5a, 5a in a projecting manner and a bell arm 13 is provided between these arm portions 5a, 5a. A handle lever 14 is mounted to the handle shaft 2 as shown in FIG. 2.

Figure 5:
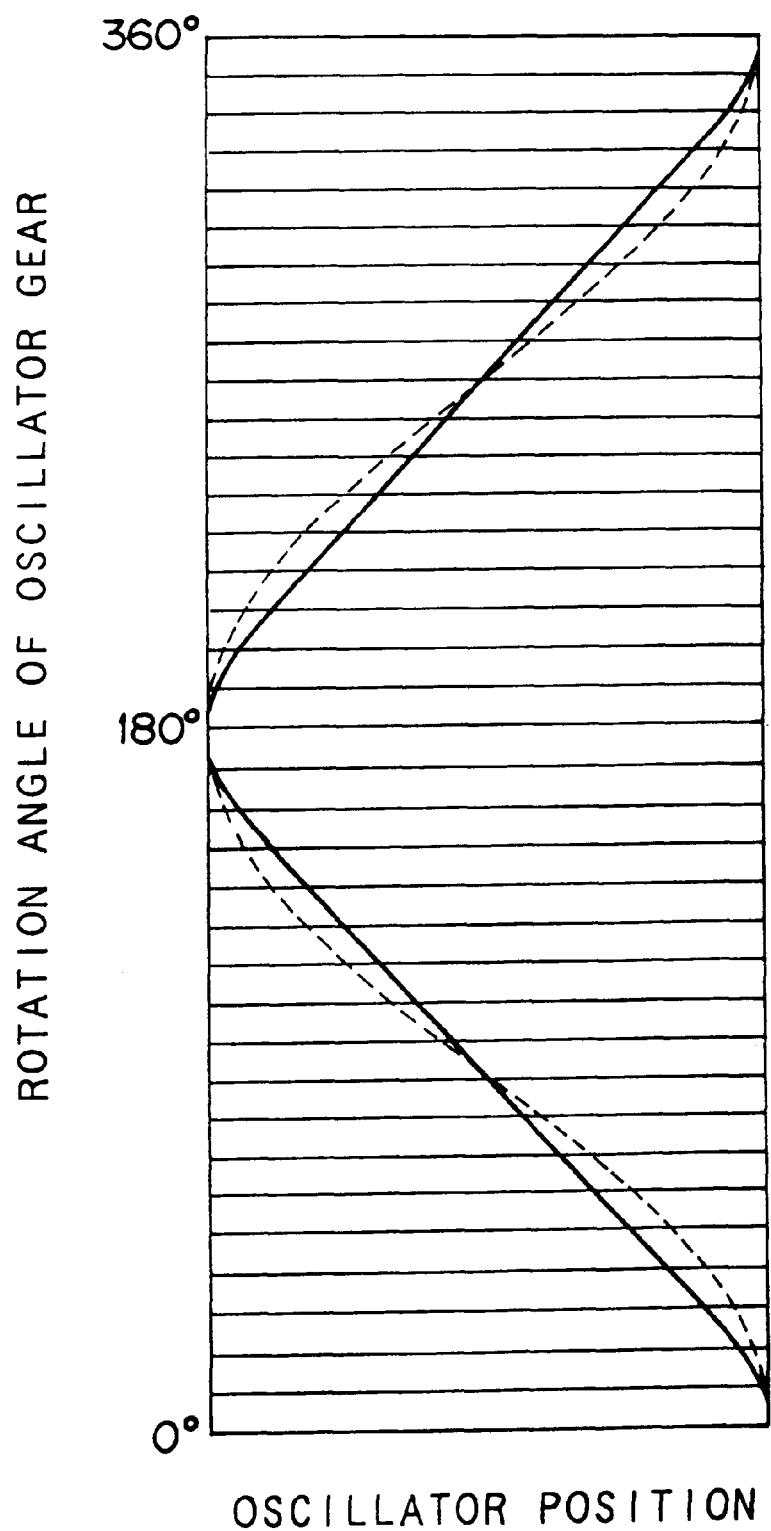
FIG. 5 is a diagram of a motion of the spinning reel of FIG. 1 and that of conventional one.
Figure 6:
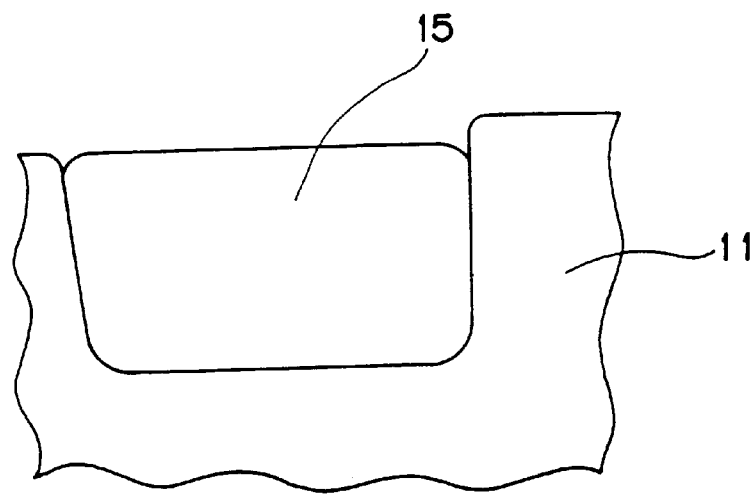
FIG. 6 is an illustration showing a spool of the spinning reel of FIG. 1 around which a fishing line is would up.
Figure 53:
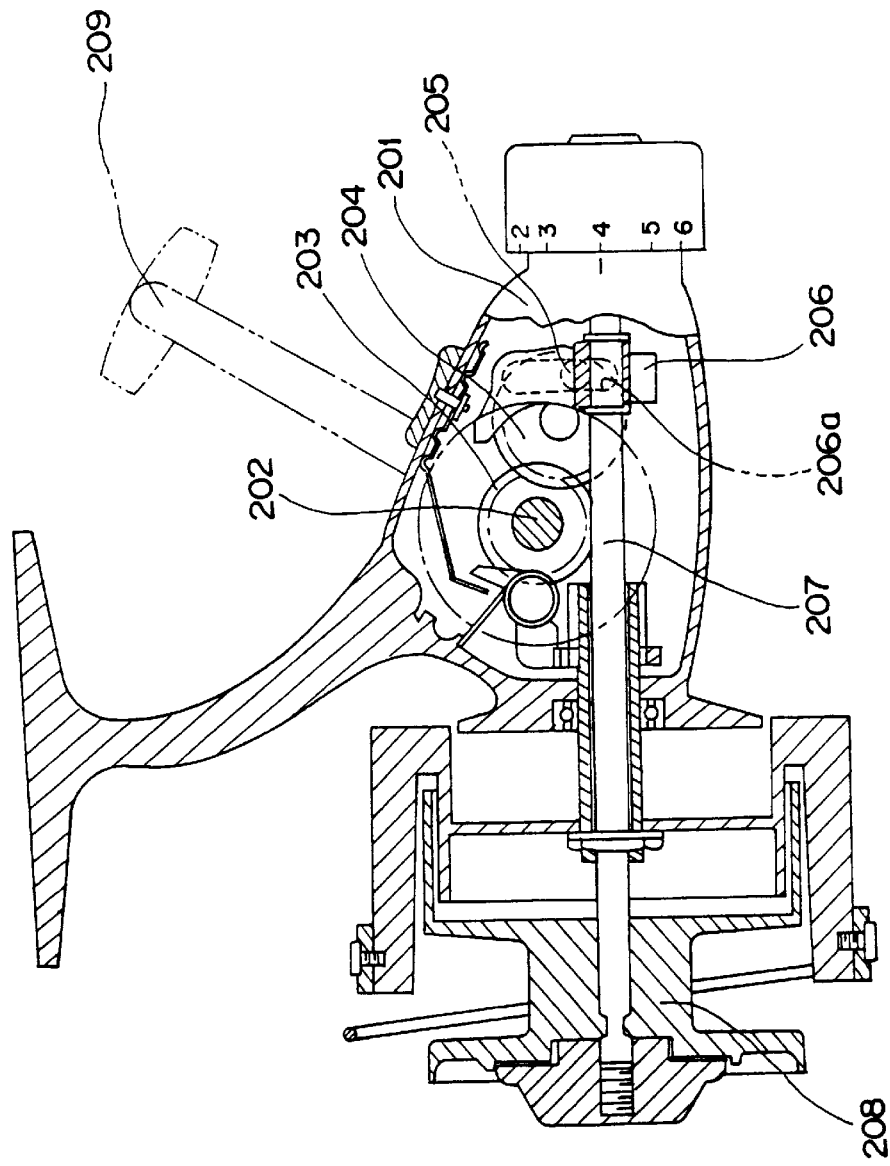
FIG. 53 is a sectional view showing a spinning reel of conventional structure.
Figure 54:
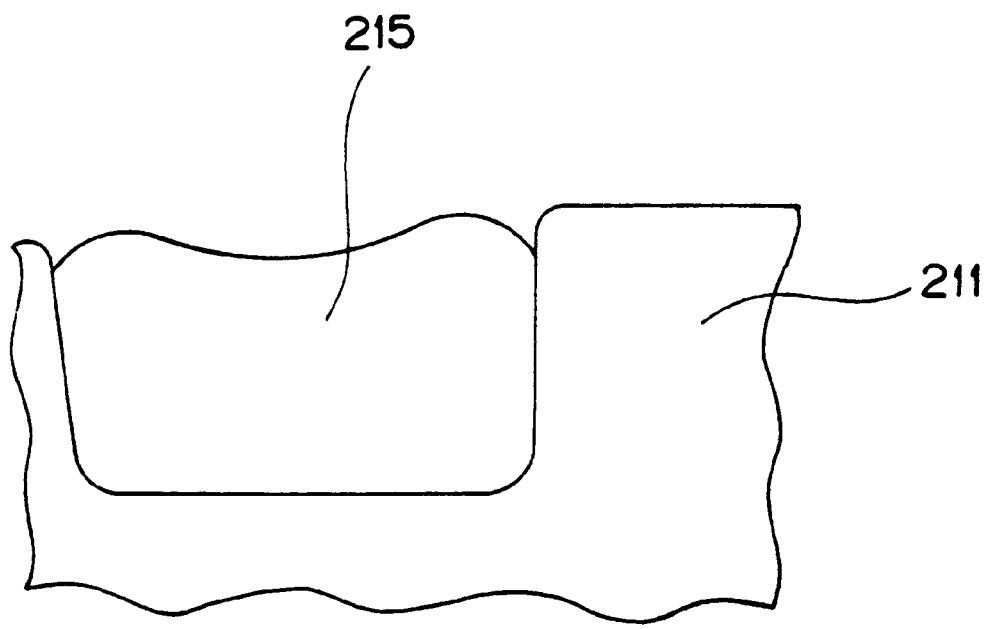
FIG. 54 is a view showing a state in which a fishing line is wound up around the spool.
Figure 55:
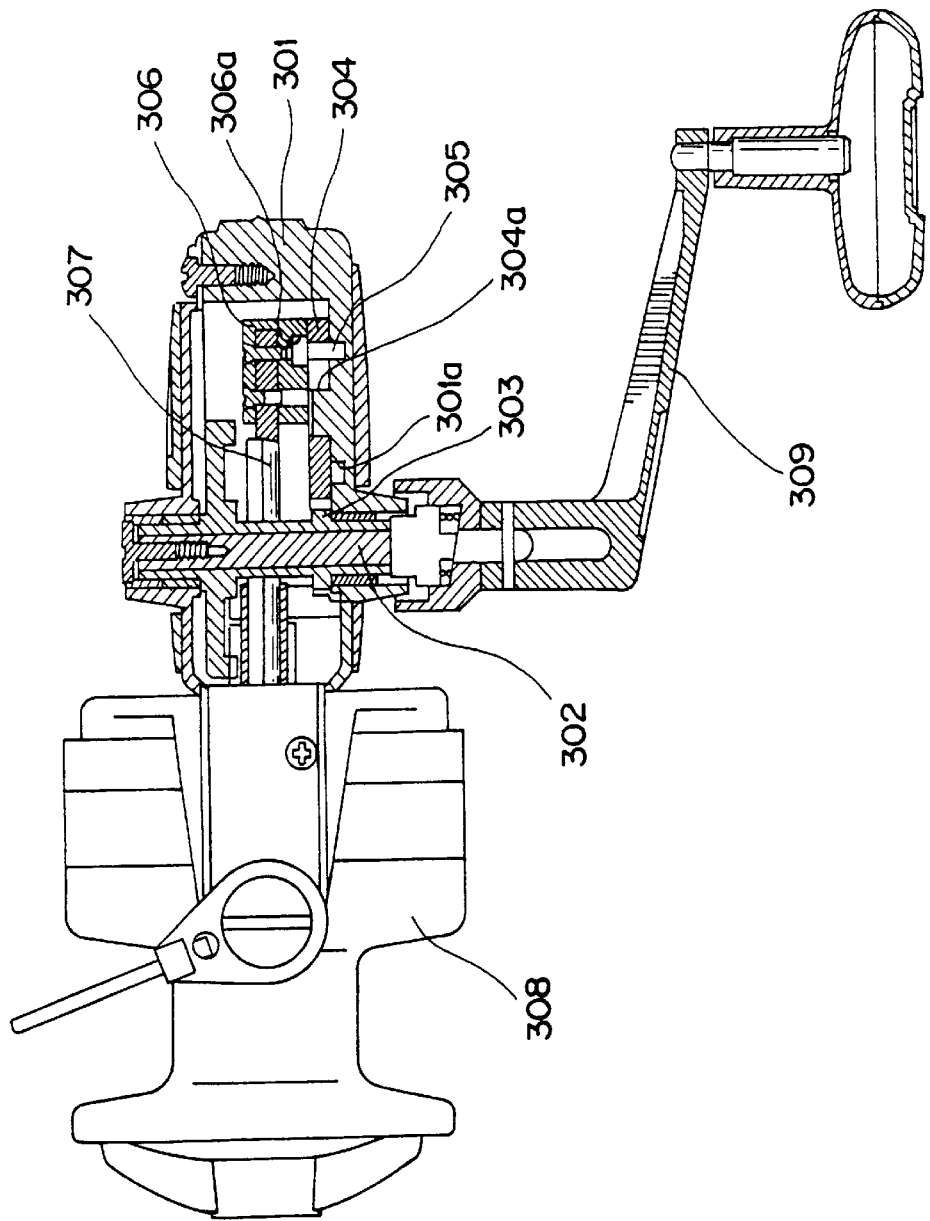
FIG. 55 is a bottom view of the spinning reel of FIG. 53.

FIG. 5 is a diagram showing the axial movement of the spool 11 in relation to the revolution angle of the oscillator gear and the position of the oscillator, in which the solid line represents the case that the cam groove 1b of this embodiment is formed and the dotted line represents the case that the spinning reel of FIG. 53 is utilized. As can be seen from this figure, according to the present invention, the spool 11 performs substantially the uniform motion along the axial direction thereof (solid line) and the fishing line 15 will not be uniformly wound up around the spinning reel (dotted line).

According to this embodiment, the spinning reel of the structure described above will operates in the following manner.

When the fishing line is wound up around the spool, the handle lever 14 is rotated to thereby rotate the handle shaft 2. According to the rotation of the handle shaft 2, the rotational frame 5 is also rotated through the engagement of the master gear 3 and the pinion 6, and the oscillator gear 4 is then rotated through the engagement with the coupling gear 4. According to the rotation of the oscillator gear 7, the rotational member 8 is rotated around the boss 1a and also revolved in a manner restricted through the engagement of the first projection 8a and the cam groove 1a. More specifically, the movement of the first projection 8a along the cam groove 1b, given by the rotation of the oscillator gear 7, causes the rotational member 8 to swing in a circular hole formed on the oscillator gear 7. The swing of the rotational member 8 causes the velocity of the second projection 8b to be increased or decreased relative to the rotational velocity of the oscillator gear 7. The oscillator 9 is moved in the bilateral direction as viewed in FIG. 2 in accordance with the rotation of the rotational member 8 while the second projection 8b of the rotational member 8 moves along the slot 9a of the oscillator 9. According to this movement of the oscillator 9, the spool 11 moves in the axial direction thereof through the spool shaft 10, and then, the fishing line wound up by the bell arm 13 is successively wound up around the spool 11.

Figure 7:
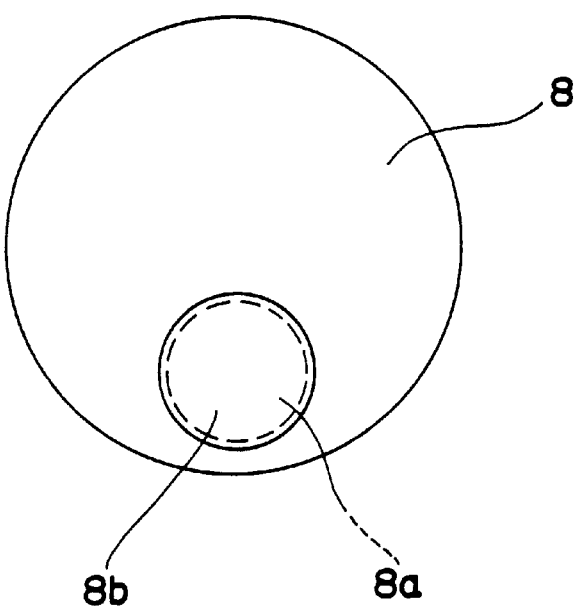
FIG. 7 is a plan view of a rotational member of another example for the spinning reel of FIG. 1.

In the above embodiment, the first and second projections 8a and 8b are shifted in angle by θ, but as shown in FIG. 7, the angle may be made as θ=0. Further, this angle θ may be set to an optional value, and by optionally setting this angle θ, the shape of the cam groove 1b will be changed accordingly. This means that the angle θ and the cam groove 1b can be set so that substantially the uniform reciprocal motion of the spool 11 can be achieved.

Figure 8:
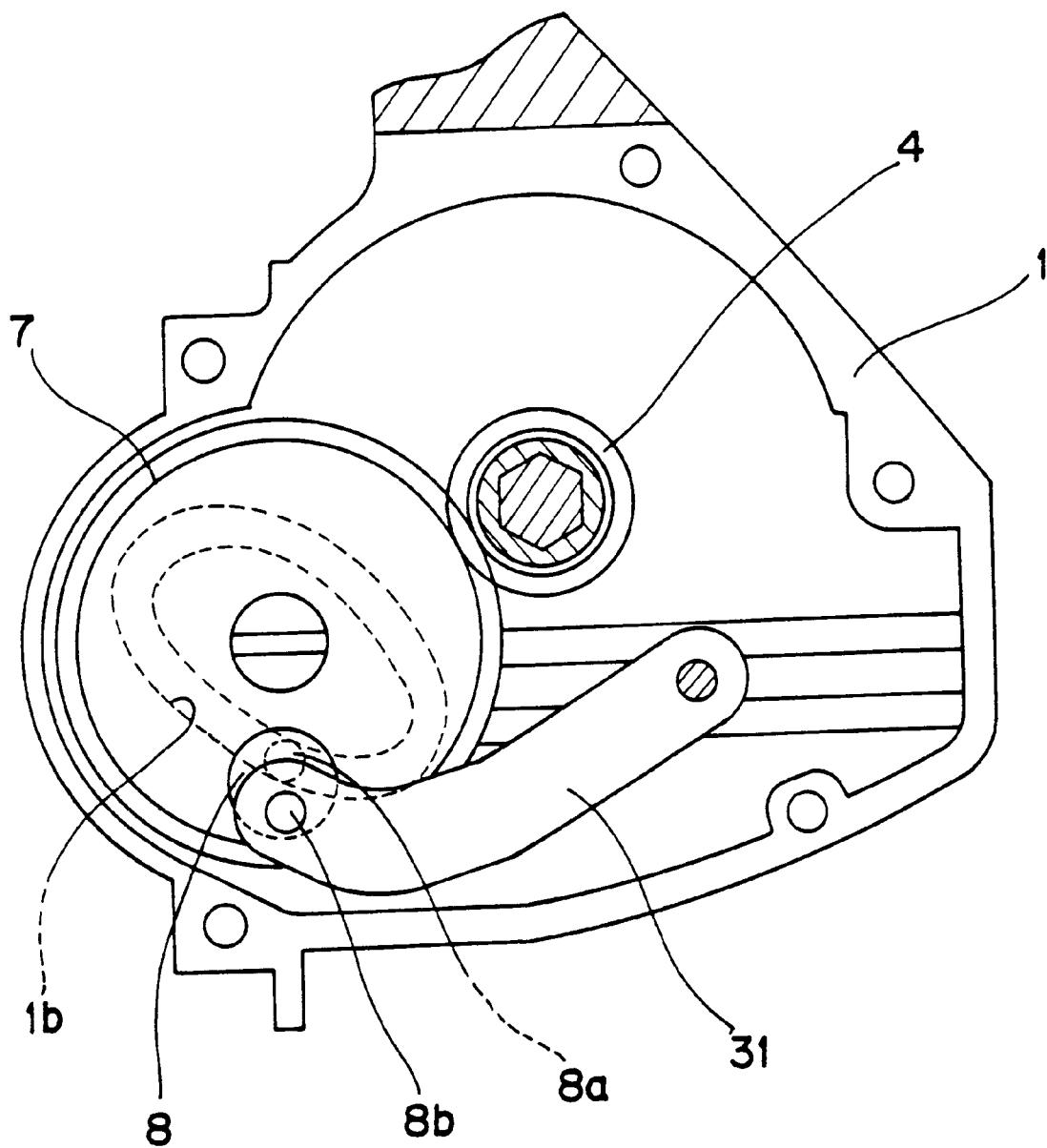
FIG. 8 is an enlarged view of an essential portion of a spinning reel of a second embodiment according to the present invention.
Figure 9:
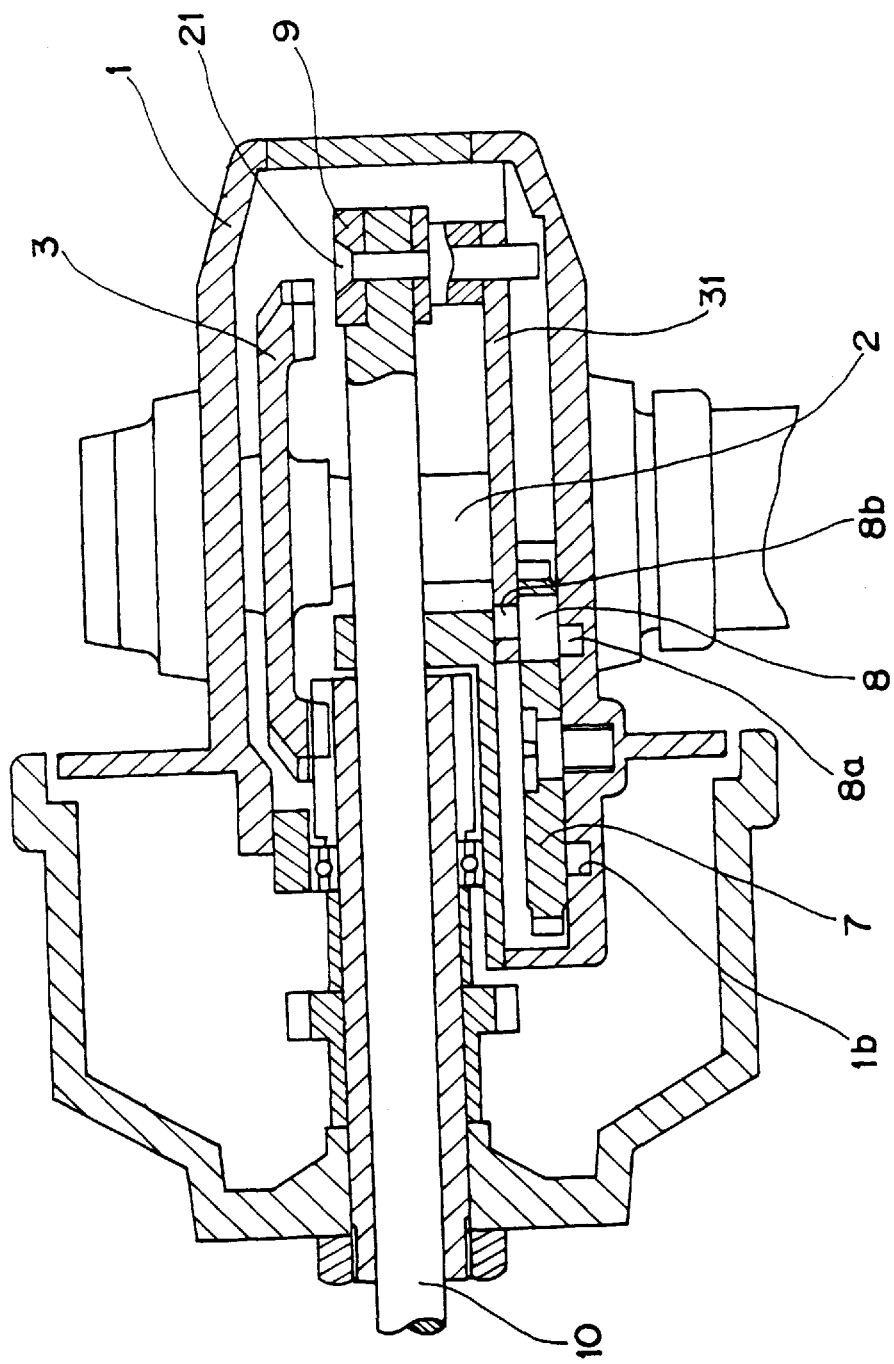
FIG. 9 is also an enlarged view in section of an essential portion of the spinning reel of the second embodiment.

A second embodiment of the present invention will be described hereunder with reference to FIGS. 8 and 9, in which FIG. 8 shows an enlarged partially sectional view of a spinning reel and FIG. 9 is a bottom view thereof and in which like reference numerals are added to members or elements corresponding to those of the first embodiment and the details thereof are omitted herein.

With reference to the second embodiment, a link 31 as a link mechanism, is interposed between the oscillator 9 and the rotational member 8, whereas the second projection 8b is engaged with the rotational member 8 as in the former first embodiment. That is, according to the second embodiment, the rotational member 8 is not necessarily directly engaged with the oscillator 9 in its structure, and a structure will be adapted in which the motion of the rotational member 8 transfers to the oscillator 9 through the link 31.

Figure 10:
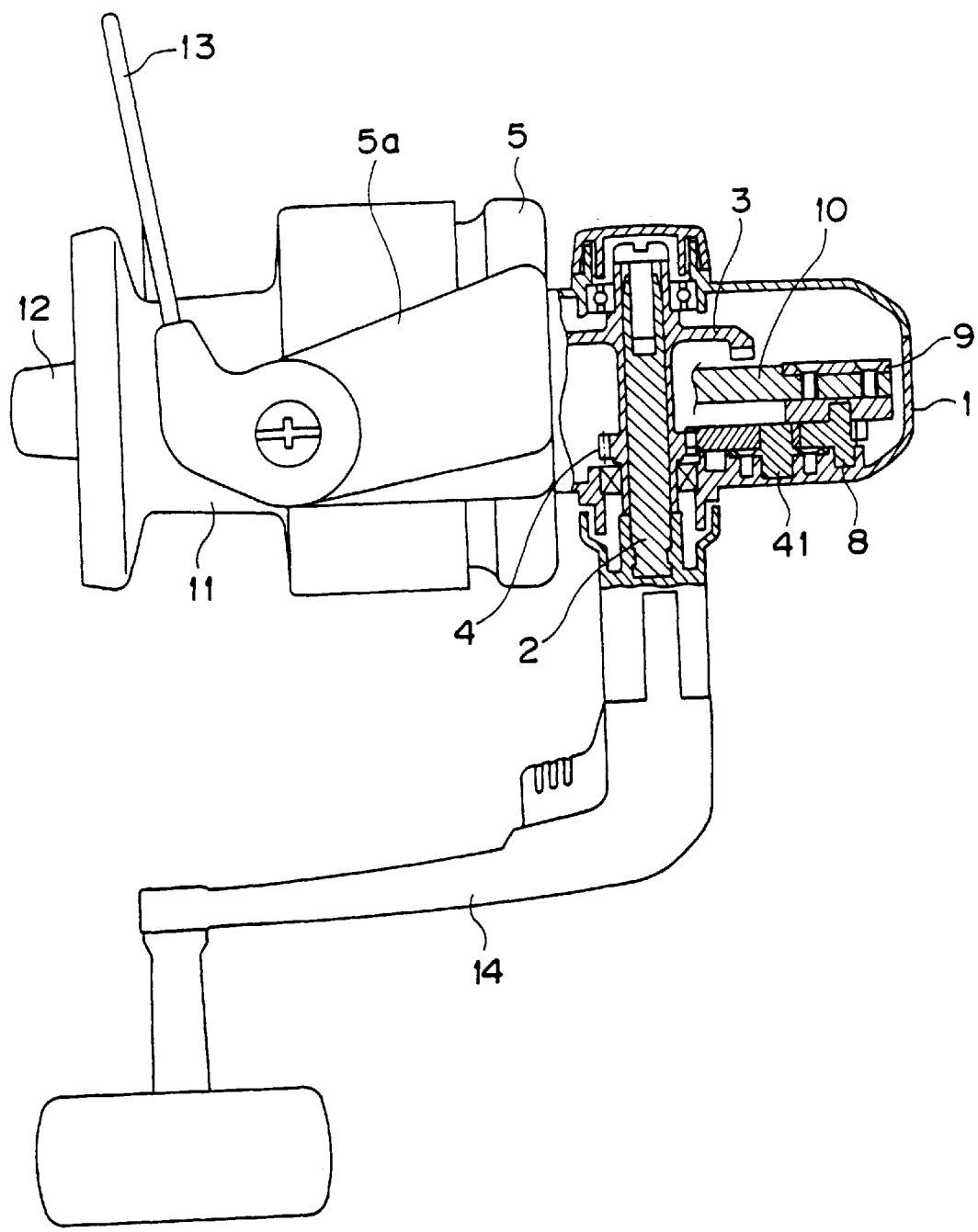
FIG. 10 is a bottom view, partially in section, of a spinning reel of a third embodiment according to the present invention.
Figure 11:
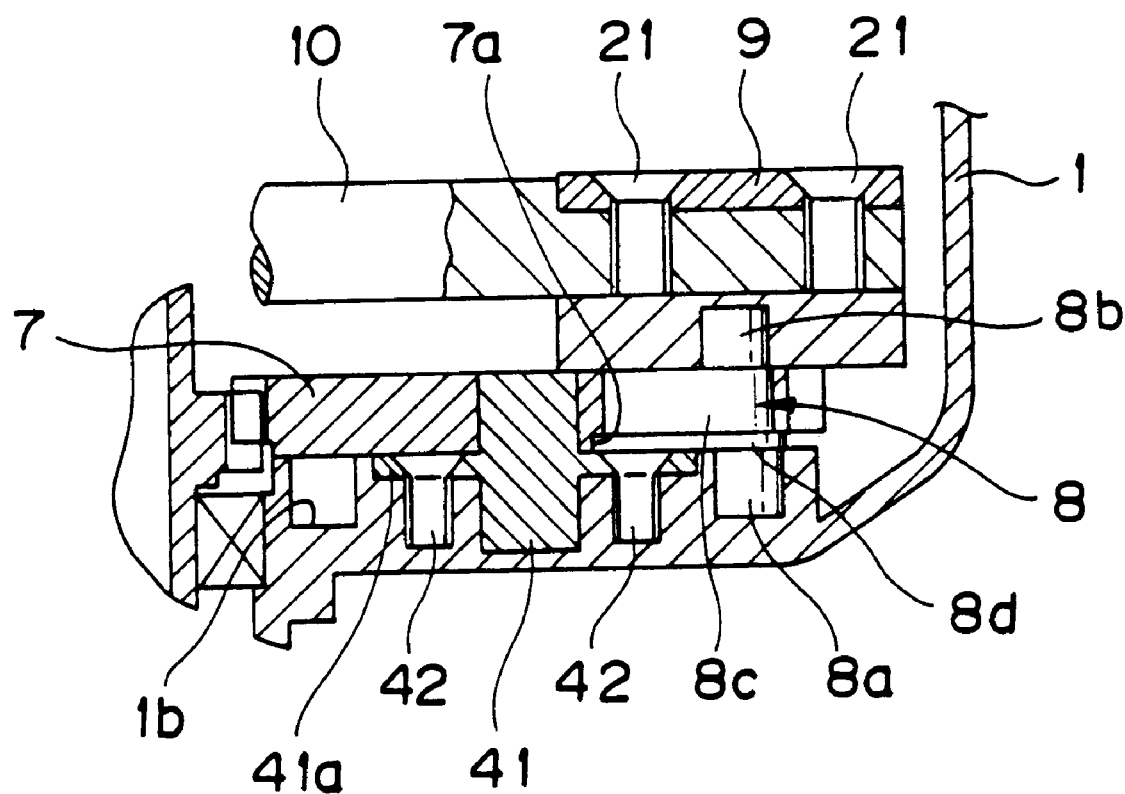
FIG. 11 is an enlarged view, partially in section, of an essential portion of a spinning reel of a third embodiment according to the present invention.

A third embodiment of the present invention will be described hereunder with reference to FIGS. 10 and 11, in which FIG. 10 shows a sectional view of a spinning reel and FIG. 11 is an enlarged view of an essential portion thereof and in which like reference numerals are added to members or elements corresponding to those of the former embodiments and the details thereof are omitted herein.

Referring to FIGS. 10 and 11, an oscillator gear shaft 41, to which an oscillator gear 7 is mounted to be rotatable, is fixed to the body casing 1 of the spinning real by means of vis 42 and the oscillator gear shaft 41 is provided with a flanged portion 41a. The rotational member 8 provided to the oscillator gear 7 is composed of a body portion 8c to be inserted into the circular hole of the oscillator gear 7, a second projection 8b projecting upward, as viewed, from the body portion 8c, a flanged portion 8d formed below the body portion 8c and a first projection 8a projecting downward from the flanged portion 8d. The flanged portion 8d is engaged with a recessed portion 7a formed to the oscillator gear 7 to limit the upward movement, as viewed in FIG. 11, of the rotational member 8.

In a conventional structure, in order to make strong the engaged structure, it is necessary to make long the engaged length of the body portion and the oscillator gear shaft, and hence, to make thick the body casing 1 or make stout the oscillator gear shaft. According to this embodiment of the present invention, however, in which the oscillator gear shaft 41 is formed with the flanged portion 41a, it is not necessary to make thick a portion of the body casing 1 to which the oscillator gear shaft 41 is mounted, thereby preventing the body casing 1 from making large.

Figure 12A:
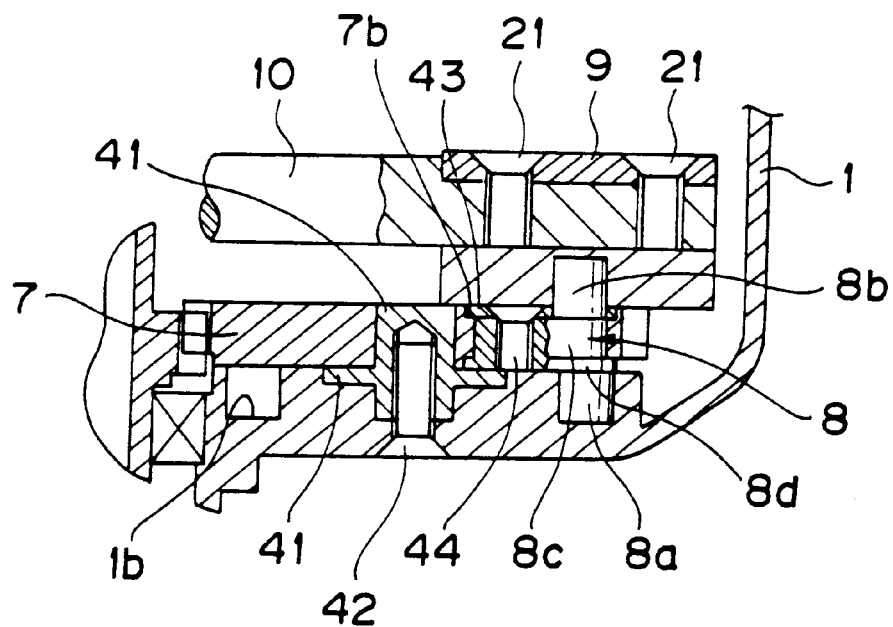
FIG. 12A is an enlarged view, partially in section, of an essential portion of a spinning reel of a fourth embodiment according to the present invention.

A fourth embodiment of the present invention will be described hereunder with reference to FIG. 12 showing an enlarged view of an essential portion of the spinning reel of the present invention, in which like reference numerals are added to members or elements corresponding to those of the former embodiments and the details thereof are omitted herein.

Figure 12B:
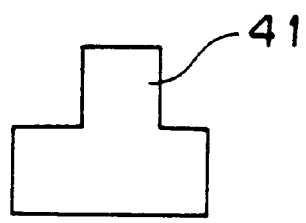
FIG. 12B is an illustration of one example of an oscillator gear shaft of the spinning reel.

In this fourth embodiment, a plate member 43 having a diameter larger than that of the body portion 8c of the rotational member 8 is fixed, by means of vis 44, to the upper surface of the body portion 8c, and the plate member 43 is aligned in its position with the recessed portion 7b formed to the oscillator gear 7. According to this structure, the backlash of the rotational member 8 can be surely prevented through the location of the flanged portion 8d and the plate member 43. Further, in this embodiment, since the vis 42 is concentrically disposed with the oscillator gear shaft 41, it is not always necessary to form the flanged portion 41a. The oscillator gear shaft 41 may have a shape as shown in FIG. 12B, which is obtained by combining a large-diameter column with a small-diameter column.

Figure 13:
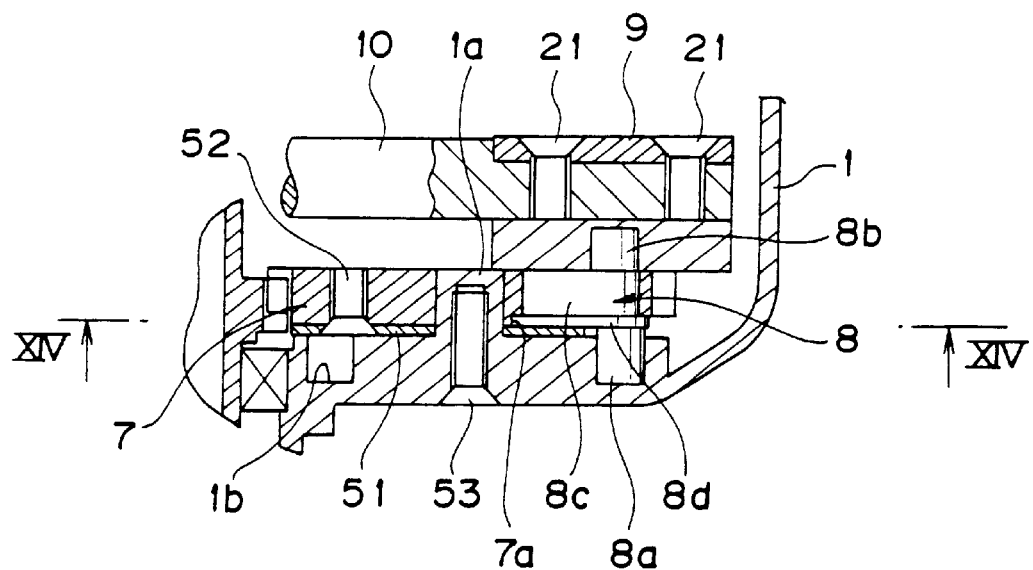
FIG. 13 is an enlarged view, partially in section, of an essential portion of a spinning reel of a fifth embodiment according to the present invention.
Figure 14:
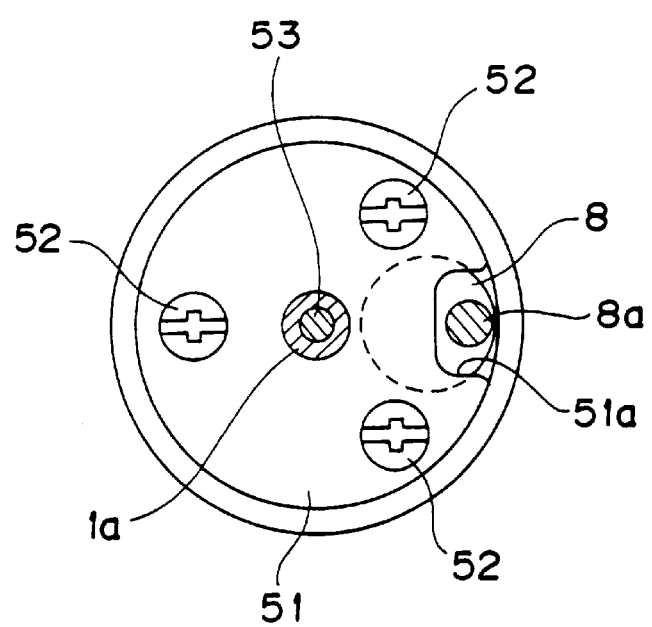
FIG. 14 is a sectional view taken along the line XIV—XIV of FIG. 13.

A fifth embodiment of the present invention will be described hereunder with reference to FIGS. 13 and 14, in which FIG. 13 shows an enlarged sectional view of an essential portion of a spinning reel of the present invention and FIG. 14 is a sectional view taken along the line XIV—XIV in FIG. 13 in which like reference numerals are added to members or elements corresponding to those of the former embodiments and the details thereof are omitted herein.

In this fifth embodiment, a plate member 51 is fixed to the oscillator gear 7 by means of vis 52 so that the plate member 51 abuts against the flanged portion 8d of the rotational member 8. A vis 53 is inserted concentrically in the boss portion 1a of the body casing 1 to improve the strength of the boss portion 1a. This reinforced structure is most applicable to a case where the body casing 1 is formed of a resin material. Referring to FIG. 14, the plate member 51 is formed with an escape portion 51a for preventing the plate member 51 from interfering with the first projection 8a of the rotational member 8. The flanged portion 8d and the plate member 51 are arranged to the lower side, as viewed, of the oscillator gear 7 in this fifth embodiment, but they may be arranged to the upper side thereof.

Figure 15:
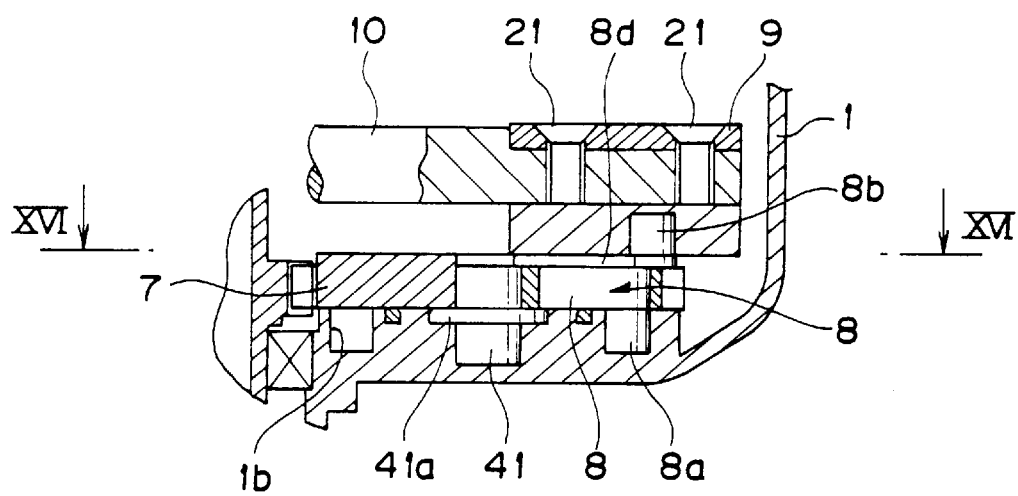
FIG. 15 is an enlarged view, partially in section, of an essential portion of a spinning reel of a sixth embodiment according to the present invention.
Figure 16:
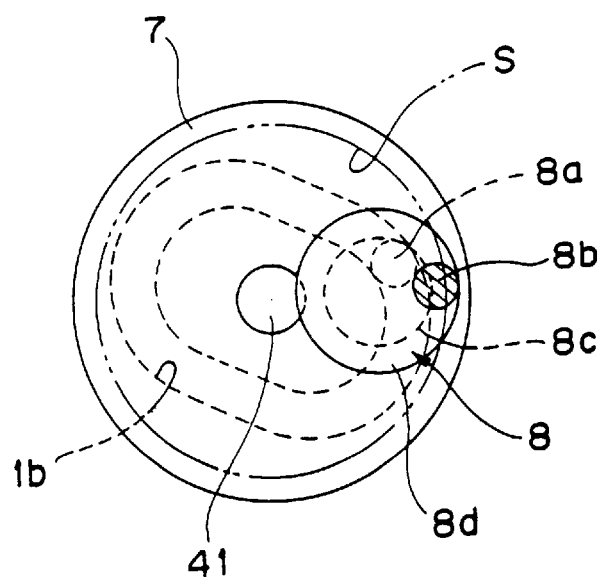
FIG. 16 is a sectional view taken along the line XVI—XVI of FIG. 13.

A sixth embodiment of the present invention will be described hereunder with reference to FIGS. 15 and 16, in which FIG. 15 shows an enlarged sectional view of an essential portion a spinning reel of the present invention and FIG. 16 is a sectional view taken along the line XVI—XVI in FIG. 15 in which like reference numerals are added to members or elements corresponding to those of the former embodiments and the details thereof are omitted herein.

In this sixth embodiment, the flanged portion 8d of the rotational member 8 is formed so as to have a diameter relatively larger than that of the body portion 8c, and according to this structure, a portion of the second projection 8b formed to the flanged portion 8d projects outward of a tooth bottom circle S of the oscillator gear 7 as shown in FIG. 16, whereby the stroke of the spool shaft 10 can be made large without making large the diameter of the oscillator gear 7. In this embodiment, the second projection 8b is formed so as to partially project over the tooth bottom circle of the oscillator gear 7. The flanged portion 8d may be arranged below the body portion 8c as shown.

Figure 17:
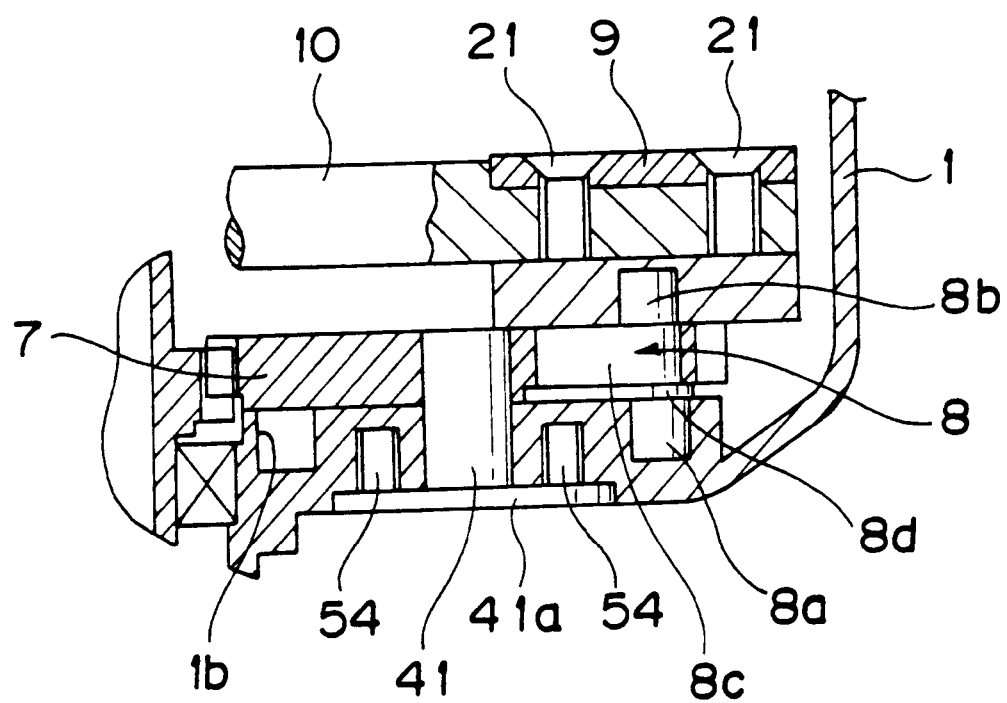
FIG. 17 is an enlarged view, partially in section, of an essential portion of a spinning reel of a sixth embodiment according to the present invention.

A seventh embodiment of the present invention will be described with reference to FIG. 17 showing an enlarged section of an essential portion of this embodiment, in which like reference numerals are added to members or elements corresponding to those of the former embodiments and the details thereof are omitted herein.

This seventh embodiment has a structure in which the oscillator gear shaft 41 is inserted into the body casing 1 from the outer side thereof and fixed at the outside thereof by means of vis 54. More specifically, the oscillator gear shaft 341 has a flanged portion 41a extending in a direction perpendicular to the axial direction of the oscillator gear shaft 41. The flanged portion 41a is secured to the body casing 1 by means of the screws 54. The oscillator gear 7 is rotatably supported on the oscillator gear shaft 41.

The present invention further includes eighth to twenty-first embodiments which will be described hereunder with reference to FIGS. 18 to 43.

First, the eighth embodiment of a spinning reel such as for fishing according to the present invention will be described with reference to FIGS. 18 and 19.

Figure 18:
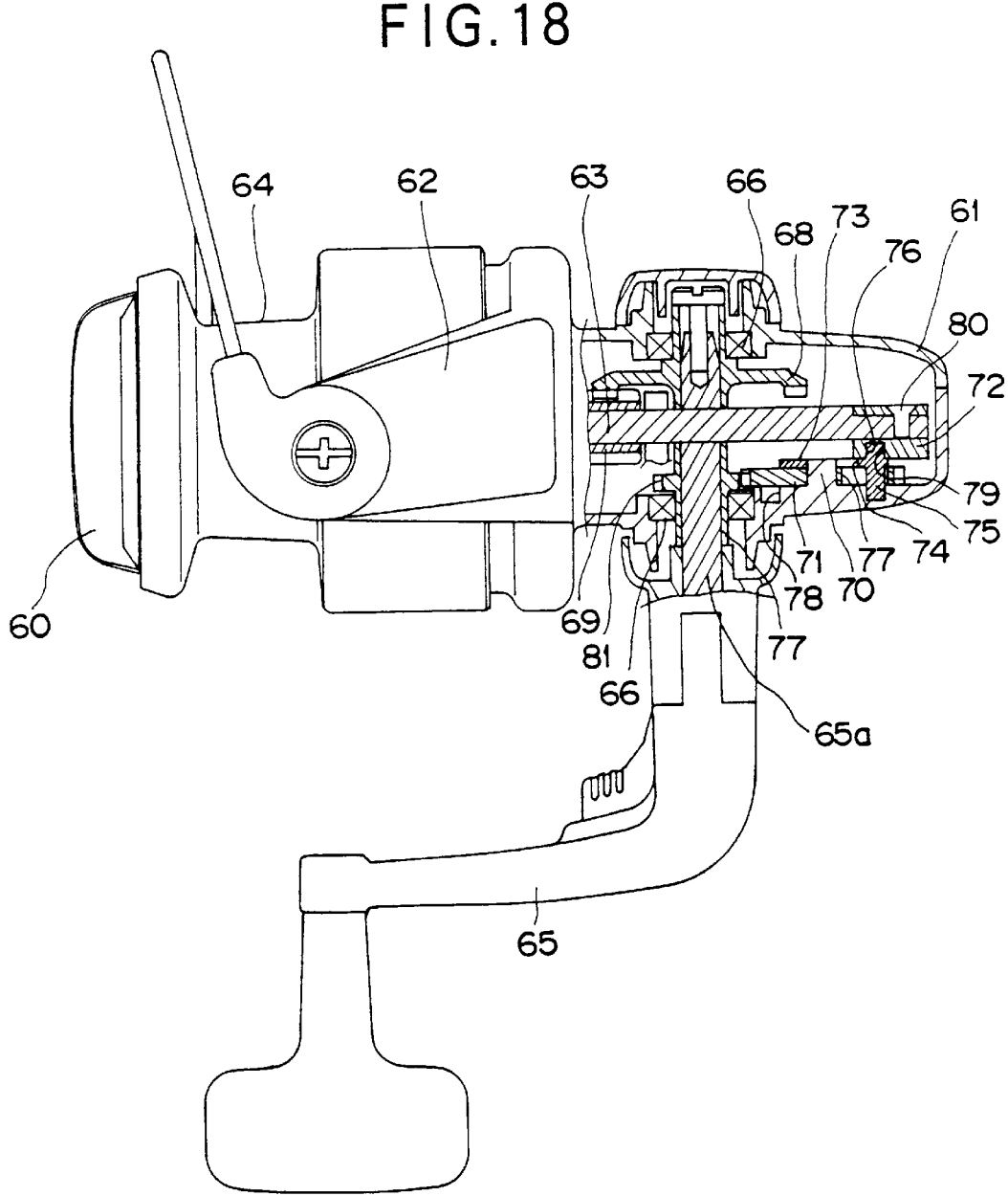
FIG. 18 is a bottom view, partially cut away, of a spinning reel such as fishing reel according to an eighth embodiment according to the present invention.
Figure 19:
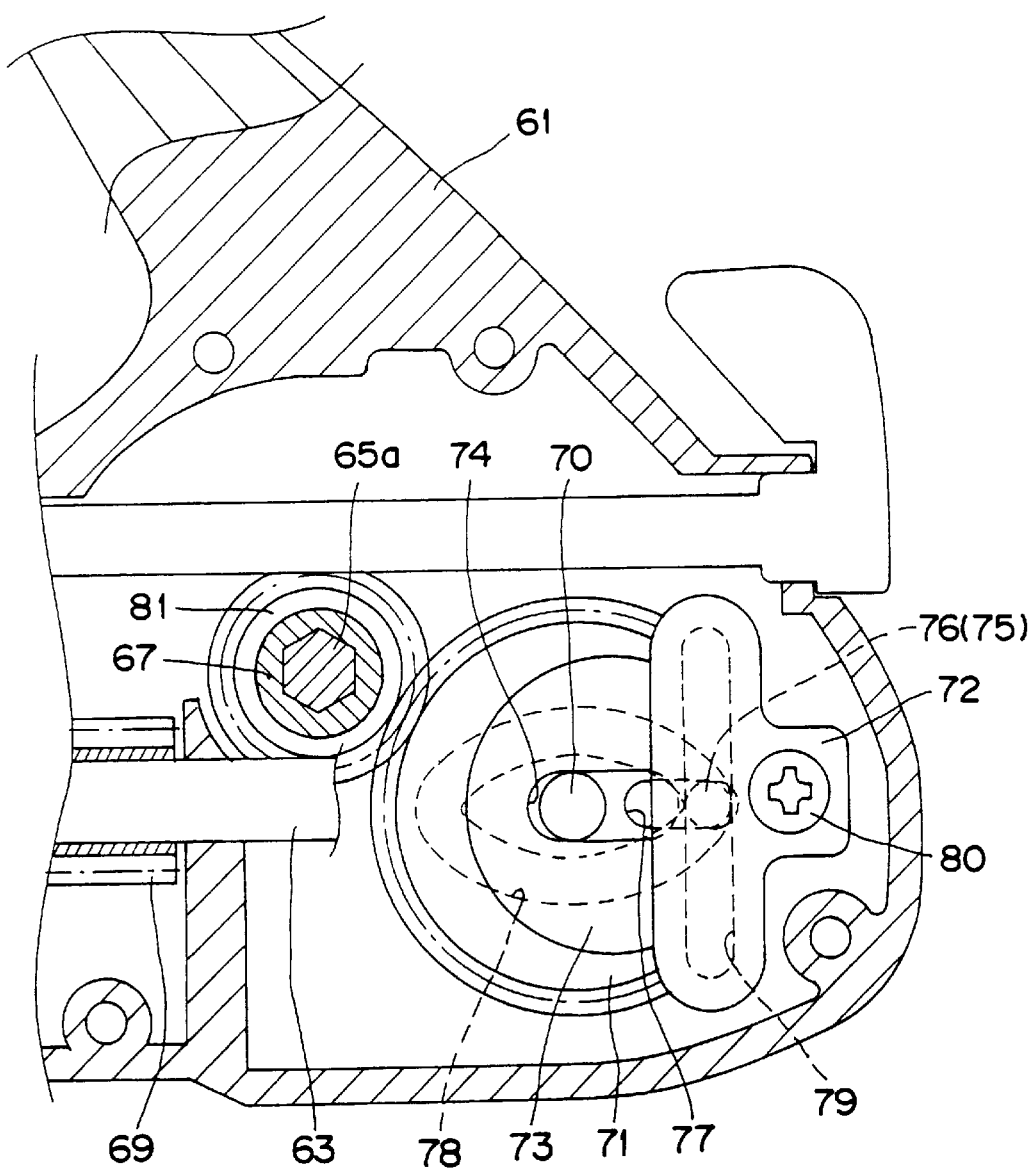
FIG. 19 is a plan view, partially cut away, of an important portion of the spinning reel of FIG. 18.

As shown in FIGS. 18 and 19, the spinning reel comprises a reel body or body casing 61 to be fixed to a fishing rod, a rotational frame 62 rotatably supported by the front portion of the reel body 61, a spool shaft 63 supported to be slidable in front and back directions of the spinning reel by the reel body 61, a spool 64 mounted to the front portion of the spool shaft 63, a handle lever 65 disposed on the side surface of the reel body 61, and a transfer mechanism for transferring the rotational motion and the longitudinal swing motion to the rotational frame 62 and the spool 64, respectively, which are converted from the rotational motion of the handle lever 65.

The transfer mechanism includes a transfer means for rotating the rotational frame 62 and the transfer means comprises a handle shaft cylinder 67 supported by the reel body 61 through a bearing 66 so as to be rotatable by the operation of the handle lever 65, a master gear 68 fixed to the handle shaft cylinder 67 and a pinion 69 integrally formed with the cylindrical shaft of the rotational frame 62 and meshed with the master gear 68. When the handle lever 65 is rotated by a fisherman, the rotation of the handle shaft 65a of the handle lever 65 is transferred to the rotational frame 62 through handle shaft cylinder 67, the master gear 68 and the pinion 69.

The transfer mechanism further includes a slide mechanism shown in FIG. 18 for sliding the spool in a longitudinal direction thereof. That is, the slide mechanism is composed of the handle shaft cylinder 67 extending in the bilateral direction of the reel body 61, an oscillator 72 fixed to the rear end of the spool shaft 63 supported by the reel body 61 so as to be slidable in the longitudinal direction thereof, a vertical groove 79 (FIG. 19) formed on the oscillator 72 in the vertical direction thereof, an oscillator gear 71 operatively connected to a coupling gear 81 integrally formed with the handle shaft cylinder 67 and supported to be rotatable with an oscillator gear shaft 70 of the reel body 61 being the rotation center, a slot 77 formed on the oscillator gear 71 which extends in the diameter direction thereof and penetrates in the vertical direction, a cam groove 78 formed on a side wall of the reel body 61 opposing to the oscillator gear 71 and having substantially an elliptical shape extending in the sliding direction of the spool shaft 63, and a rotational plate member 73, which is rotatable together with the oscillator gear 71. The rotational plate member 73 has on the opposing surfaces thereof the first projection 75 and the second projection 76. The first projection 75 passes through the slot 77 of the oscillator gear 71 and engages with the cam groove 78 of the reel body casing 61. The second projection 76 engages with the vertical groove 79 of the oscillator 72. The rotational plate member 73 is slidable in a longitudinal direction of the slot 77 of the oscillator gear 71.

The spool shaft 63, which penetrates the pinion 69 formed on the rotational frame 62, supports the spool 64 at the front end side of a spool shaft 72 projecting forward the rotational frame 62. A drug knob 60 is fitted to a threaded front portion of the spool shaft 63 so that the spool 64 does not come off. The oscillator 72 is fixed to the rear end of the spool shaft 63 by means of vis 80, and the oscillator 72 has, as shown in FIG. 19, a shape extending in the vertical direction of the reel body 61 to prevent the spool 72 from rotating and having a flat surface opposing to the rotational plate 73 and the vertical groove 79 is formed to this flat surface.

The oscillator gear 71 is meshed with a coupling gear 81 secured to the handle shaft cylinder 67 so as to rotate around the oscillator gear shaft 70 through the rotation of the handle shaft cylinder 67. An inner wall surface of the reel body 61 corresponding to the oscillator gear 71 is formed as a perpendicular wall section and the oscillator gear 71 rotates while contacting the perpendicular wall section. The slot 77 is formed to the oscillator gear 71 so as to extend in the radial direction thereof from a portion near the oscillator gear shaft 70 and the first projection formed to one side of the rotational plate 73 is inserted into the slot 77.

The cam groove 78 formed to the reel body 61 has substantially elliptical shape so that the long diameter side thereof lies along the front and back direction of the reel. The elliptical shape thereof has a center corresponding to the oscillator gear shaft 70 and has a long diameter portion as an x-axis in the front and back direction of the reel body 61 in FIG. 19 and a short diameter portion as a y-axis in a direction normal to the x-axis. Providing that an angular displacement is $\theta$ and an oscillate amount is S, the elliptical shape is a closed curve represented by, for example, $x=S/2-S\theta/\pi$, and $y=x \tan \theta$. However, in actual, a curve having a shape similar to the above curve may be adopted.

As the rotational plate 73, a plate-like member will be utilized, and in an actual embodiment, although a disc shape plate is used, a rectangular plate member may be used. The oscillator gear shaft 70 is engaged with the central portion of the rotational plate 73 so that the slot 74 is slid on the disc along the slot 77 with the oscillator gear shaft 70 being the center of rotation. Referring to FIG. 18, the first projection 75 and the second projection 76 projecting from the bilateral surfaces of the rotational plate 73 are round shafts integrally protruded from the rotational plate 73 in the illustrated embodiment, the round shafts having axes extending in a direction perpendicular to the flat surface of the disc. The first projection 75 penetrates the slot 77 of the oscillator gear 71 and engages with the cam groove 78 and the second projection 76 is engaged with the vertical groove 79 of the oscillator 72.

The rotational plate 73 has flat surfaces contacting the oscillator 72 and the cam groove 78 and is held between the oscillator gear 71 and the oscillator 72, so that a smooth reciprocal sliding motion with constant velocity can be done with maintaining horizontal levelness with no deflection.

According to the embodiment described above, when the handle lever 65 is rotated, the handle shaft cylinder 67 is accordingly rotated and the rotational frame 62 is hence rotated through the transfer mechanism. The oscillator gear 71 meshed with the coupling gear 81 is also rotated, and the rotational plate 73 is moved in the same direction of the oscillator gear 71 by giving a motion force to the first projection 75 engaged with the oscillator gear 71 in the rotating direction. Further, since the rotational plate 73 is moved by an amount corresponding to a parallel displacement of the first projection 75 from the long diameter portion to the short diameter portion or vise verse along the cam groove 78 with which the first projection 75 is engaged, the second projection 76 is moved in the sliding direction at a constant velocity, whereby the second projection 76 performs a movement similar to a closed curve, the oscillator 72 engaged with the second projection 76 through the vertical groove 79 performs the reciprocal sliding motion at a constant velocity in the longitudinal direction thereof, and the spool 64 also performs the reciprocal motion in the longitudinal direction in association with the rotation of the rotational frame 62.

Figure 20:
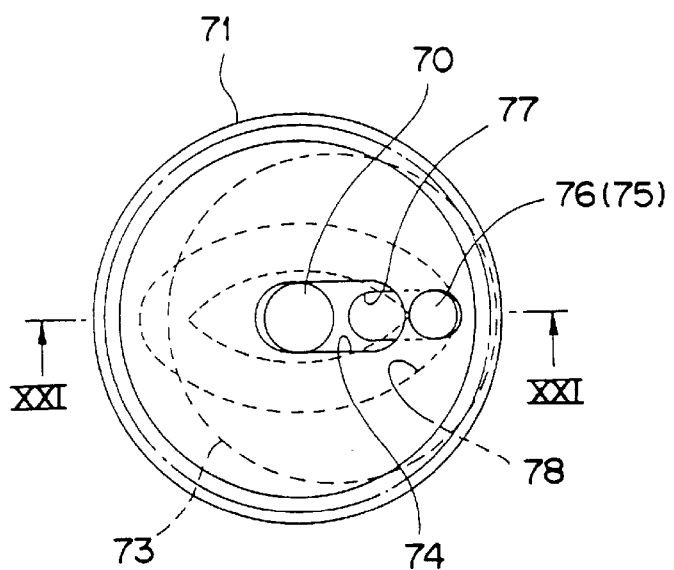
FIG. 20 is a view showing an arrangement of a spinning reel of the ninth embodiment of the present invention.
Figure 21:
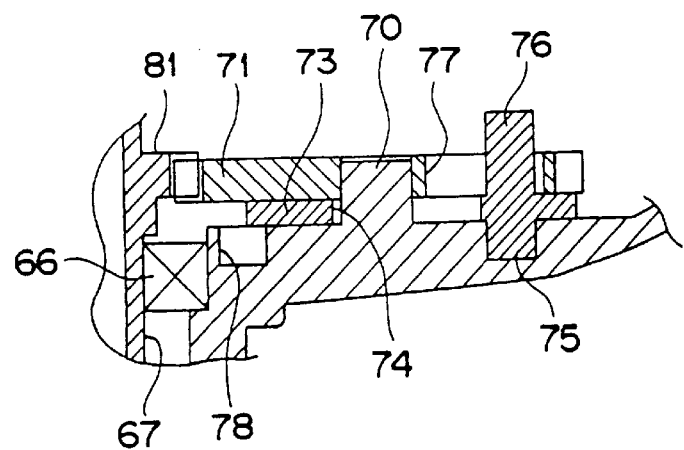
FIG. 21 is a sectional view taken along the line XXI—XXI of FIG. 20.

FIGS. 20 and 21 represent a ninth embodiment of the present invention, in which the rotational plate 73 of the eighth embodiment is disposed between the oscillator gear 71 and the upper surface of the cam groove 78 of the reel body 61, and the other end 76 penetrates the slot 77 of the oscillator gear 71. The front end of the second projection 76 is engaged with the vertical groove 79 of the oscillator 72 as shown in FIG. 19 and described above.

Figure 22:
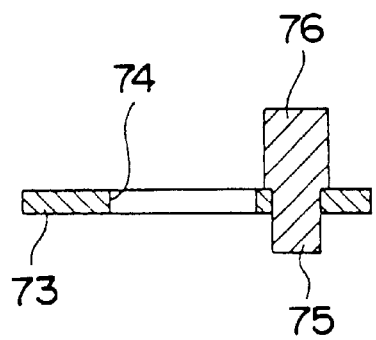
FIG. 22 is a view showing an arrangement of a spinning reel according to a tenth embodiment of the present invention.

FIG. 22 represents a tenth embodiment of the present invention, in which the first and second projections 75, 76 are given by a single pin, which is separately formed from the rotational plate 73 and secured thereto.

Figure 23:
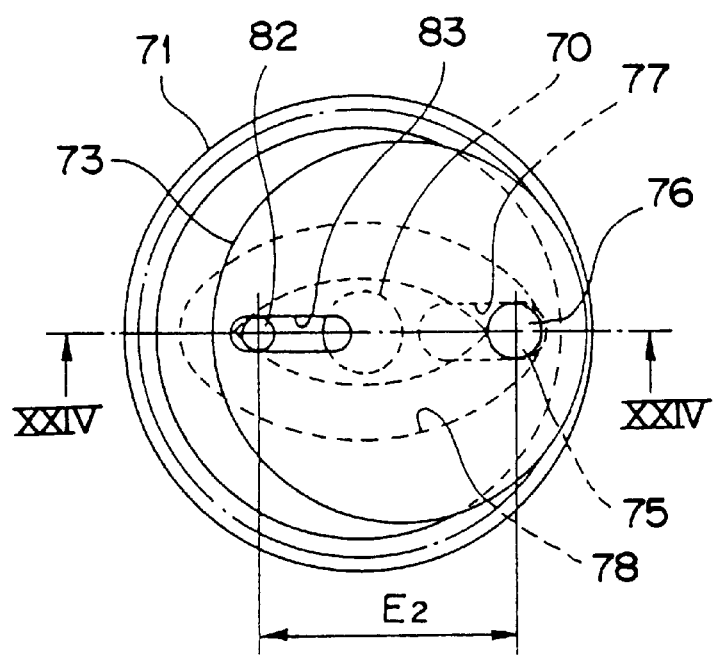
FIG. 23 is a view showing an arrangement of a spinning reel according to an eleventh embodiment of the present invention.
Figure 24:
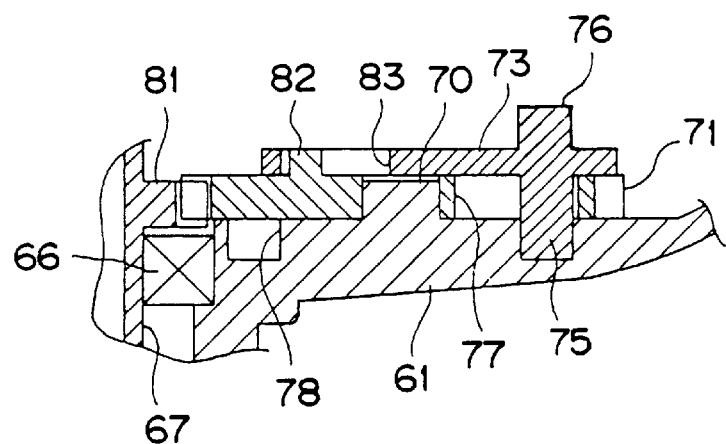
FIG. 24 is a sectional view taken along the line XXIV—XXIV in FIG. 23.

FIGS. 23 and 24 represent an eleventh embodiment of the present invention, in which the oscillator gear 71 is formed with the slot 77 apart from the oscillator gear shaft 70 in a diametrical direction thereof and a projection 82 apart from the oscillator gear shaft 70 in the opposite direction thereof. A slot 83 is formed on the rotational plate 73 on the side opposing to the first and second projections 75 and 76 relative to the center of the rotational plate 73. The oscillator gear shaft 70 is interposed between the slot 77 and the projection 82.

According to this embodiment, a distance E2 between the first projection 75 and the projection 82 is widened in comparison with distances in the eighth and ninth embodiments and, hence, the distance between the oscillator gear 71 and the rotational plate 73 is made large, so that the oscillator 72 and the spool 64 can perform smooth swing motions with constant velocities in the longitudinal direction thereof in comparison with the eighth and ninth embodiments because the tilting of the rotational plate 73 can be made small in the case of the equal distance between the oscillator gear 71, the rotational plate 73 and the oscillator 72.

Figure 25:
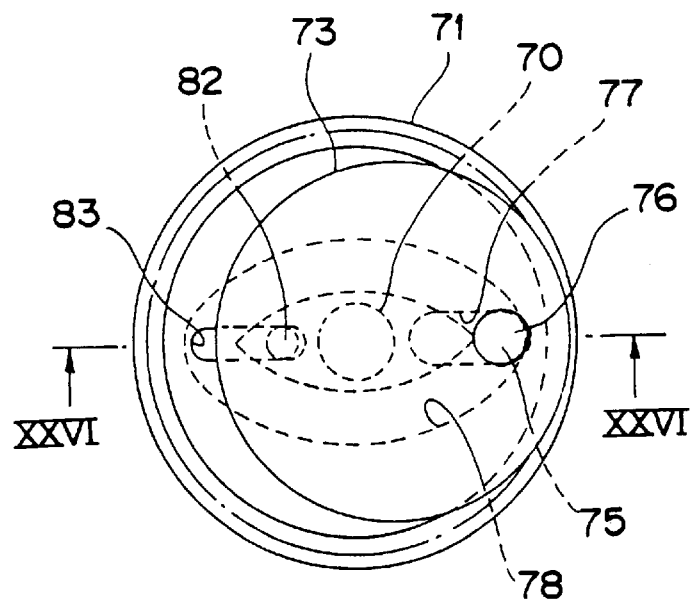
FIG. 25 is a view showing an arrangement of a spinning reel according to a twelfth embodiment of the present invention.
Figure 26:
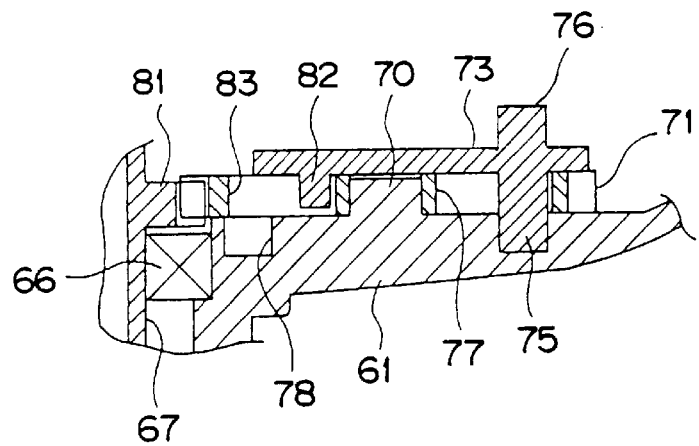
FIG. 26 is a sectional view taken along the line XXVI—XXVI in FIG. 25.

FIGS. 25 and 26 represent a twelfth embodiment of the present invention, in which the positional relationship of the projection 82 and the slot 83 is reversed between the rotational plate 73 and the oscillator gear 71 in comparison with the former eleventh embodiment. According to this embodiment, substantially the same effects as those of the eleventh embodiment can be achieved.

Figure 27:
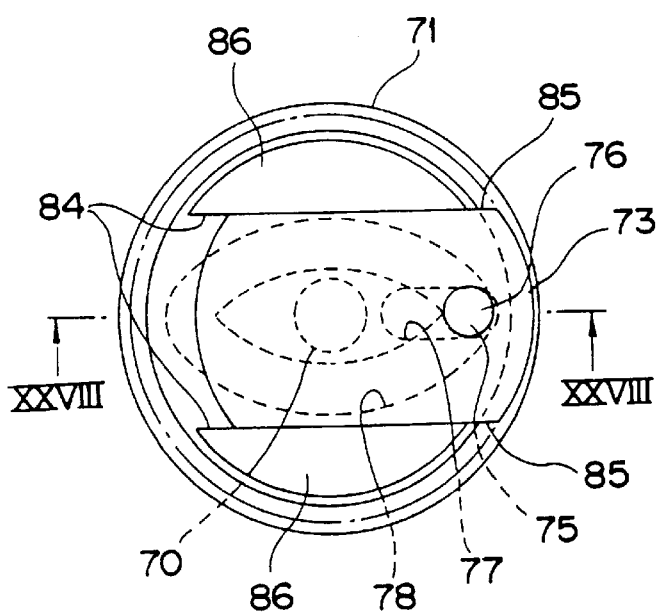
FIG. 27 is a view showing an arrangement of a spinning reel according to a thirteenth embodiment of the present invention.
Figure 28:
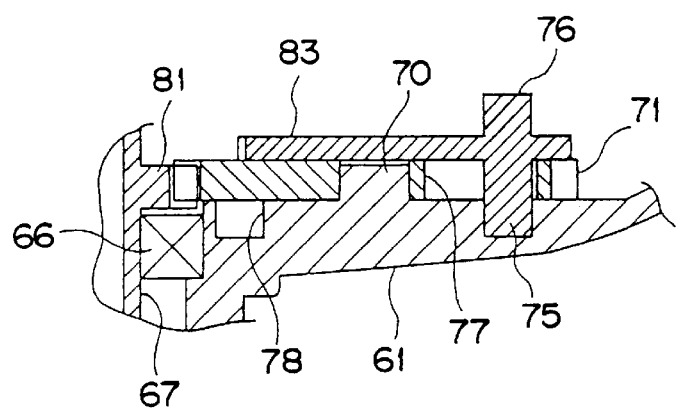
FIG. 28 is a sectional view taken along the line XXVIII—XXVIII in FIG. 27.

FIGS. 27 and 28 represent a thirteenth embodiment of the present invention, in which, in place of the projection 82 and the slot 83 in the tenth and eleventh embodiments, a guiding surface 84 and a surface to be guided 85, which are mutually engageable with each other, are formed between the oscillator gear 71 and the rotational plate 73. In the illustrated embodiment, the guiding surfaces 84 are formed by forming a pair of protruded pieces 26 to one surface of the oscillator gear 71 so as to provide opposing flat surfaces, and the surfaces 85 to be guided are formed by cutting out circular portions of the rotational plate 73 so as to provide parallel cut surfaces.

The present invention is not limited to the above structure, and in an alternation, a known structure may be adapted in which guide grooves are formed to one surface of the oscillator gear 71 and engaging portions to be engaged with the guide grooves are formed to the rotational plate 73.

Figure 29:
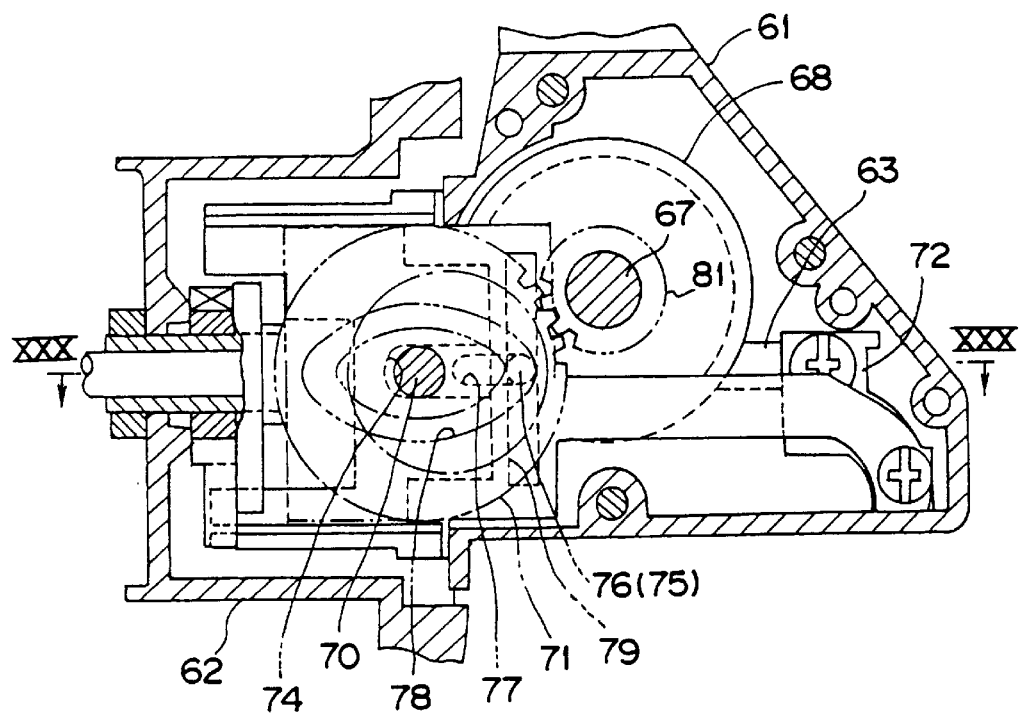
FIG. 29 is a view showing an arrangement of a spinning reel according to a fourteenth embodiment of the present invention.
Figure 30:
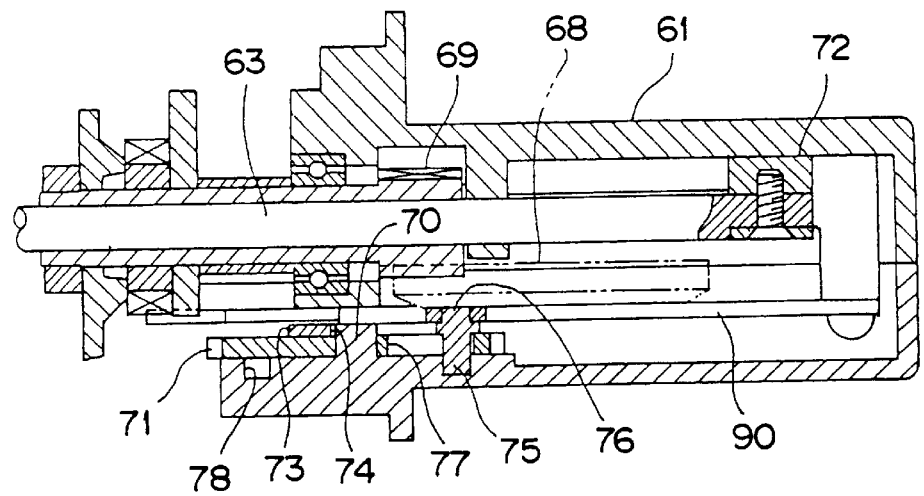
FIG. 30 is a sectional view taken along the line XXX—XXX in FIG. 29.

FIGS. 29 and 30 represent a fourteenth embodiment of the present invention, in which the oscillator gear 71 is disposed in front of the coupling gear 81 corresponding to the mounting position of the handle lever 65 (FIG. 18), and a slider 90 is fixed to the oscillator 72. The slider 80 is formed with the vertical groove 79 with which the second projection 76 is engaged. According to this structure, when the oscillator gear 71 is rotated, the second projection 76 moves along the cam groove 78 and causes the slider 90 to slide in the longitudinal direction thereof. As a result, the spool 64 carries out the reciprocal motion through the oscillator 72 to which the slider 80 is fixed and the spool shaft 63.

Figure 31:
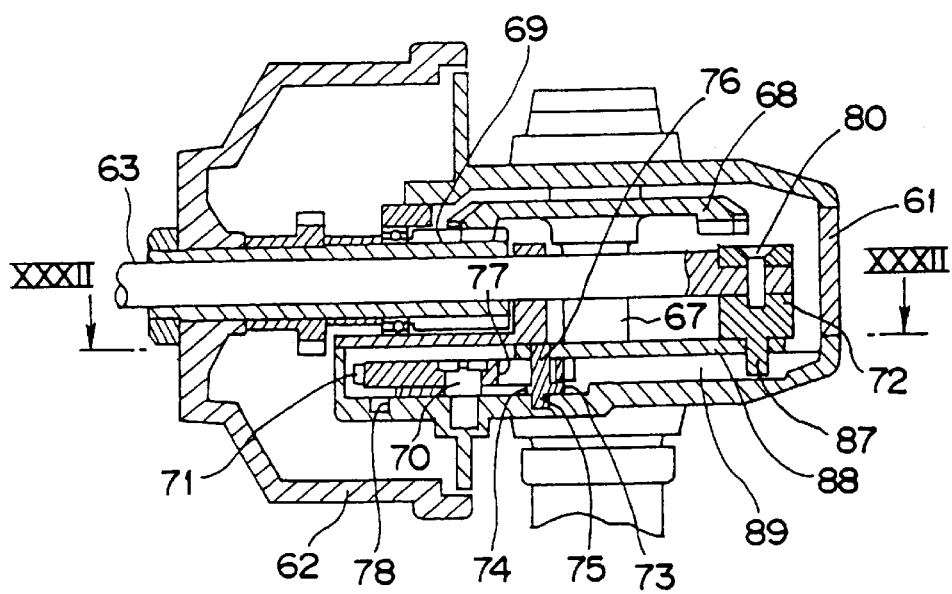
FIG. 31 is a view showing an arrangement of a spinning reel according to an fifteenth embodiment of the present invention.
Figure 32:
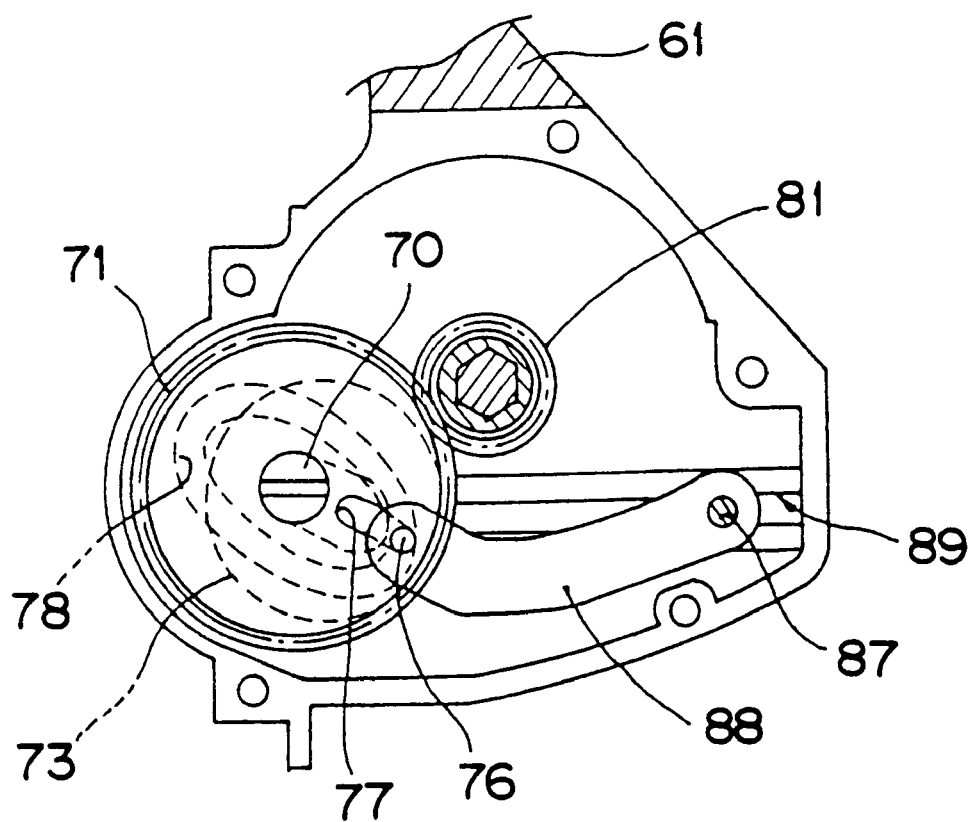
FIG. 32 is a sectional view taken along the line XXXII—XXXII of FIG. 31.

FIGS. 31 and 32 represent a fifteenth embodiment of the present invention, in which the oscillator gear 71 is disposed in front of the master gear 68. The oscillator 72 is formed with a pin 87 in place of the vertical groove 79 in the former embodiment, and the pin 87 is coupled with the second projection 76 on the side of the rotational plate 73 through a link 88.

Further, the reel body 61 is formed with a groove 89 for properly guiding the oscillator 72 in the longitudinal direction thereof and the front end of the pin 87 is inserted into the groove 89. According to such structure, when the oscillator gear 71 is rotated, the second projection 76 moves along the cam groove 78, and the spool 64 performs a reciprocal sliding motion in the longitudinal direction through the oscillator 72 to which the link 88 is connected by the pin 87 and the spool shaft 63.

Figure 33:
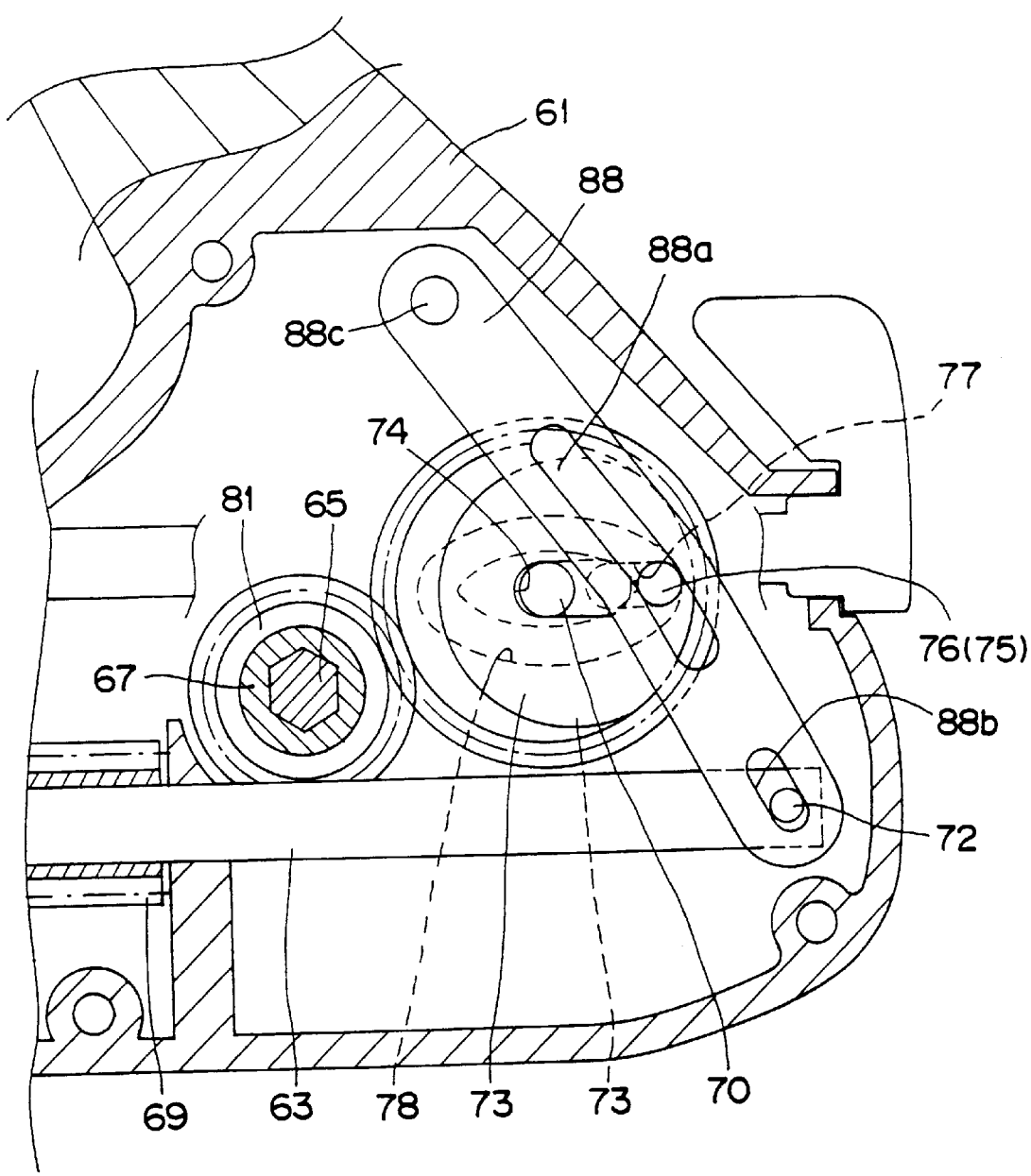
FIG. 33 is a view showing an arrangement of a spinning reel according to a sixteenth embodiment of the present invention.

FIG. 33 represents a sixteenth embodiment of the present invention, in which the second projection 76 formed to the rotational plate 73 and the oscillator 72 are connected to the link 88 supported swingably to a fulcrum pin 88c of the reel body 61 through slots 88b and 88a, respectively.

According to this structure, the elliptical motion of the second projection 76 along the cam groove 78 is converted to the sliding motion of the spool shaft 63 through the swing motion of the link 88 with the fulcrum pin 88c being the center of the swing motion.

According to this embodiment, since the distances between the fulcrum pin 88c and the second projection 76 and between the fulcrum pin 88c and the oscillator 72 can be changed, the sliding amount of the oscillator 72 can be increased or decreased, and accordingly, the sliding motion in accordance with a bobbin winder shell of the spool can be adjusted. Furthermore, the sliding speed during the sliding motion can be partially adjusted by changing the inclination angles and the shapes of the slots 88b and 88a.

Figure 34:
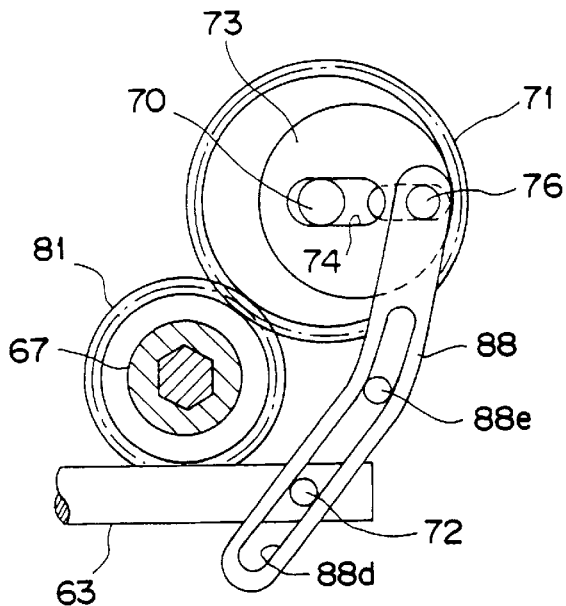
FIG. 34 is a view showing an arrangement of a spinning reel according to a seventeenth embodiment of the present invention.

FIG. 34 represents a seventeenth embodiment of the present invention, in which the second projection, 76 formed to the rotational plate 73 and the oscillator 72 are coupled respectively to the link 88 supported to a boss 88e of the reel body 61 to be swingable. In this embodiment, the link 88 is swingable with the second projection 76 being the fulcrum of the swing motion, and the boss 88e in shape of pin projecting from the reel body 61 and the oscillator 72 in shape of pin are fitted into the slot 88d formed to the link 88. According to this structure, the elliptical movement of the second projection 76 along the cam groove 78 is converted to the sliding motion with a constant speed from the oscillator 72 to the spool shaft 63 through the swing motion of the link 88 with the boss 88e being the center of the swing motion.

Further, the sliding amount and the sliding speed of the oscillator 72 can be properly adjusted by changing the distances between the boss 88e and the second projection 76 and between the boss 88e and the oscillator 72, changing the location of the boss 88e, changing the oscillator 72 to a fulcrum pin and changing the shape and the inclination of the slot 88d.

Figure 35:
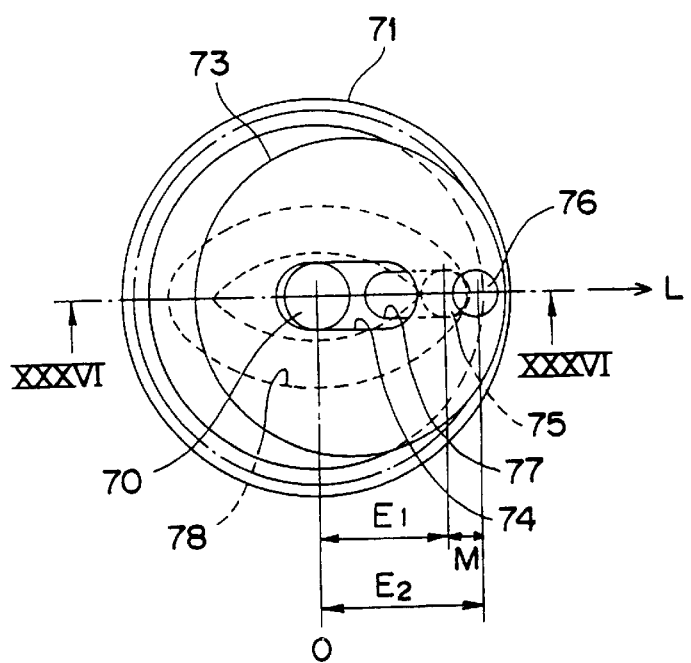
FIG. 35 is a view showing an arrangement of a spinning reel according to an eighteenth embodiment of the present invention.
Figure 36:
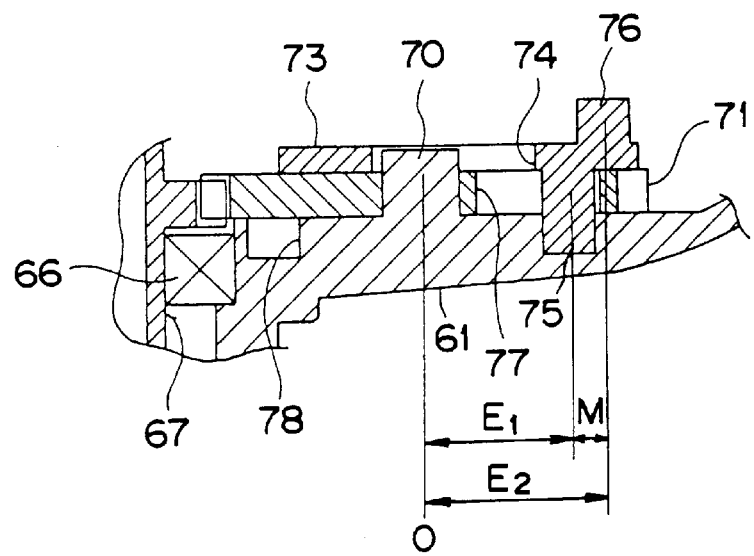
FIG. 36 is a sectional view taken along the line XXXVI—XXXVI of FIG. 35.

FIGS. 35 and 36 represent an eighteenth embodiment of the present invention, in which the second projection 76 is located eccentrically from the first projection 75 toward the diameter direction M of the oscillator gear shaft 70. According to this structure, providing that the distance between an indication line O showing the rotational center of the oscillator gear 71 and the elliptical center of the cam groove 78 and the first projection 75 and the center on the long diameter of the cam groove 78 is E1 and a distance between the indication line O and the second projection 76 E2, an equation E1<E2 is established. Therefore, the oscillation amount is increased by 2M=2(E2−E1) in comparison with the case where the both first and second projections 75 and 76 lie on the same axis. On the contrary, in the case of E1>E2, the oscillation amount can be reduced by the amount of 2 M.

Further, the oscillation amount can be properly adjusted in accordance with the bobbin winder shell by forming the mounting position of the second projection 76 to the rotational plate 73 to be changeable.

Figure 37:
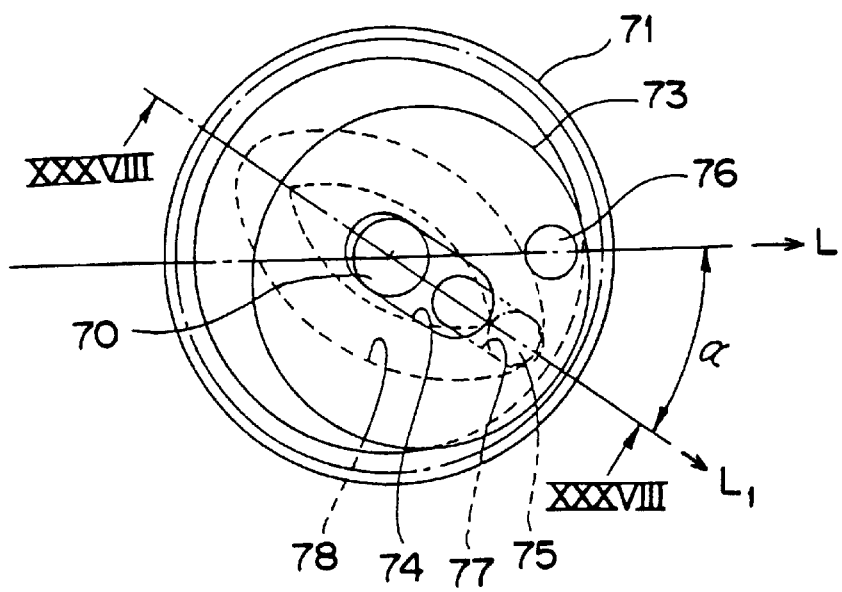
FIG. 37 is a view showing an arrangement of a spinning reel according to a nineteenth embodiment of the present invention.
Figure 38:
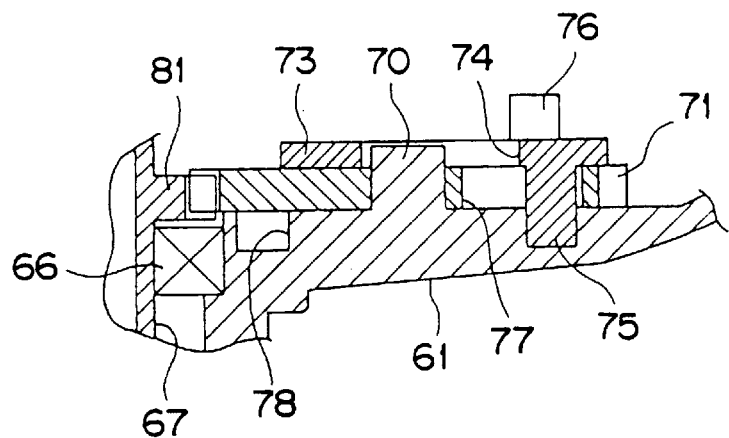
FIG. 38 is a sectional view taken along the line XXXVIII—XXXVIII of FIG. 37.

FIGS. 37 and 38 represent a nineteenth embodiment of the present invention, in which the pin formed on the rotational plate 73 is formed such that the second projection 76 engaged with the vertical groove 79 is displaced in an angel α in a peripheral direction, i.e. counterclock-wise direction, of the oscillator gear 71 with respect to the first projection 75 engaged with the cam groove 78. The cam groove 78 is also formed such that the long diameter direction L1 of the elliptical shape of the cam groove 78 is displaced in an angle α in the sliding direction L of the spool.

Figure 39:
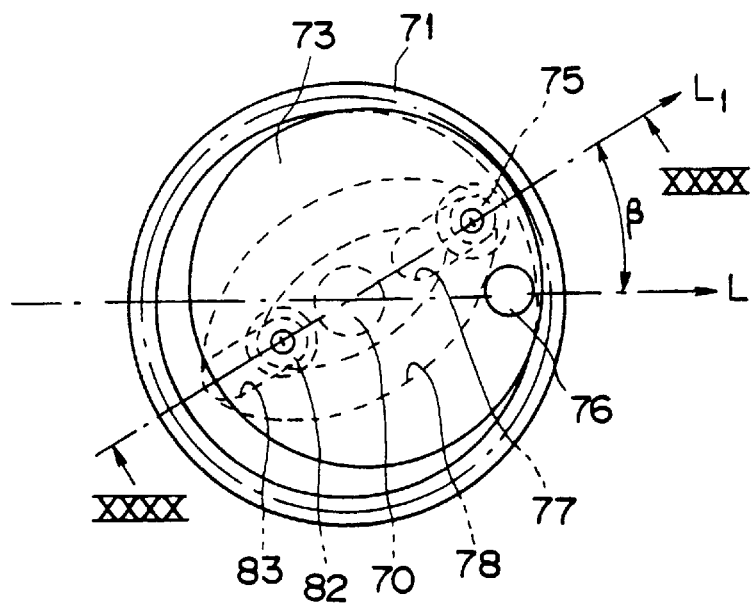
FIG. 39 is a view showing an arrangement of a spinning reel according to a twentieth embodiment of the present invention.
Figure 40:
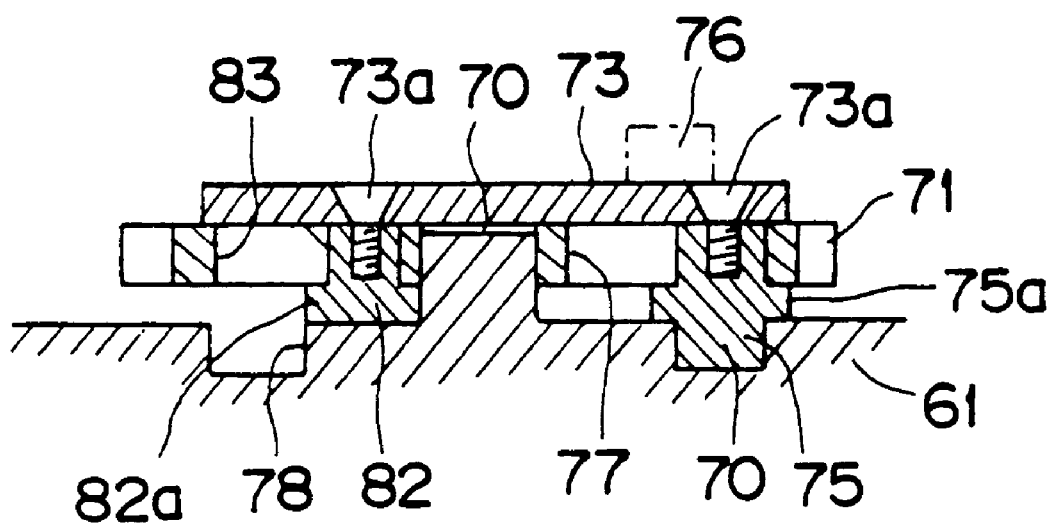
FIG. 40 is a sectional view taken along the line XXXX—XXXX of FIG. 39.

FIGS. 39 and 40 represent a twentieth embodiment of the present invention, in which the pin formed on the rotational plate 73 is formed such that the second projection 76 engaged with the vertical groove 79 is displaced in an angle β in a peripheral direction, i.e. clockwise direction, of the oscillator gear 71 with respect to the first projection 75 engaged with the cam groove 78. The cam groove 78 is also formed such that the long diameter direction L1 of the elliptical shape of the cam groove 78 is displaced in an angle β in the sliding direction L of the spool.

Further, as in the twelfth embodiment mentioned before, the projection 82 formed to the rotational plate 73 is inserted into the slot 83 formed to the oscillator gear 71. The projection 82 and the first projection 75 are fixed to the rotational plate 73 by means of screws 73a, 73a, respectively. Further, the rotational plate 73 and the oscillator gear 71 are snapped together between flanged portions 75a and 82a formed to the first projection 75 and the projection 82, so that the oscillator gear 71 can be clamped by the flanged portions 75, 82a and the rotational plate 73 to prevent the same from deflecting.

Figure 41A:
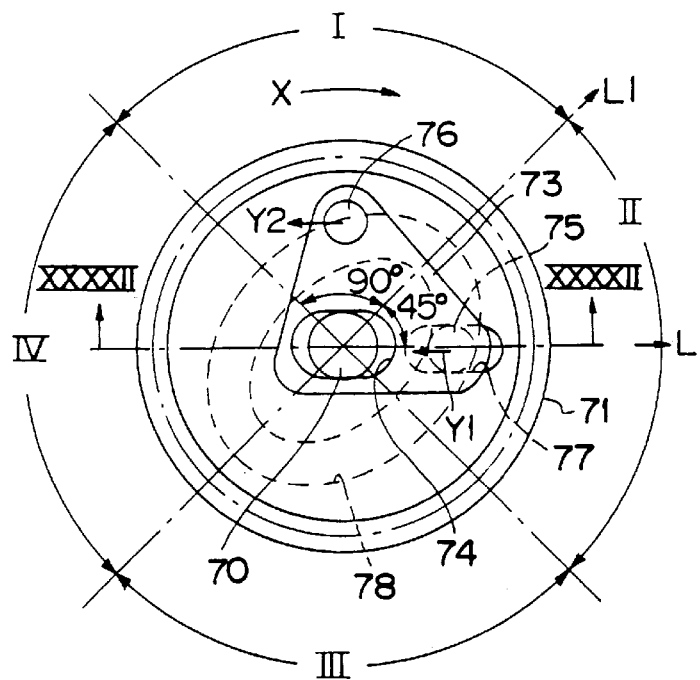
FIG. 41 is a view showing an arrangement of a spinning reel of a twenty-first embodiment of the present invention.
Figure 41B:
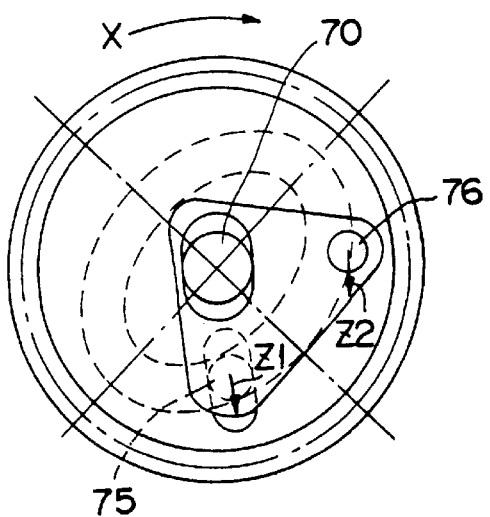
Figure 42:
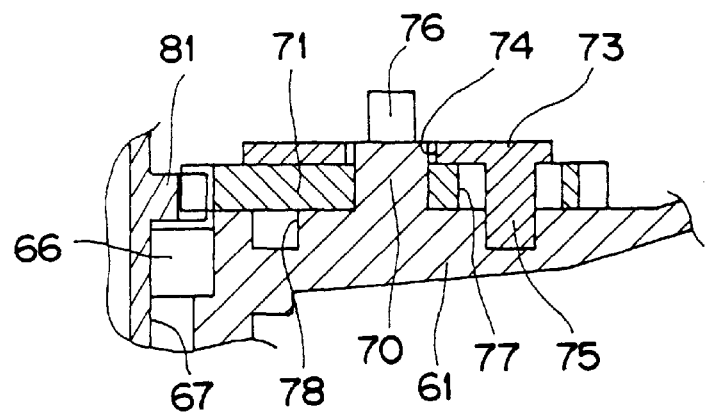
FIG. 42 is a sectional view taken along the line XXXXII—XXXXII in FIG. 41.

FIGS. 41 and 42 represent a twenty-first embodiment of the present invention, in which the pin is formed on the rotational plate 73 such that the second projection 76 engaged with the vertical groove of the oscillator is displaced in an angle of about 90° in a peripheral direction of the oscillator gear 71 with respect to the first projection 75 engaged with the cam groove 78. The cam groove 78 is also formed such that the long and short diameters of the elliptical shape of the cam groove 78 are crossed in the sliding direction of the spool by angles of 45° and 135°, respectively.

Accordingly, as shown in FIG. 41A, in the case where the first projection 75 is in the II quadrant (or IV quadrant), the first projection 75 moves in a reduced diameter direction Y1 by the rotation of the oscillator gear 71 toward the positive rotational direction X, so that the second projection 76 and the rotational plate 73 move and slow down in a direction Y2 reverse to the direction X. On the other hand, as shown in FIG. 41B, in the case where the first projection 75 is in the I quadrant (or III quadrant), the first projection 75 moves in a widened diameter direction Z1 by the rotation of the oscillator gear 71 toward the positive rotational direction X, so that the second projection 76 and the rotational plate 73 move and accelerate in the same direction Z2 as the direction X.

Figure 43:
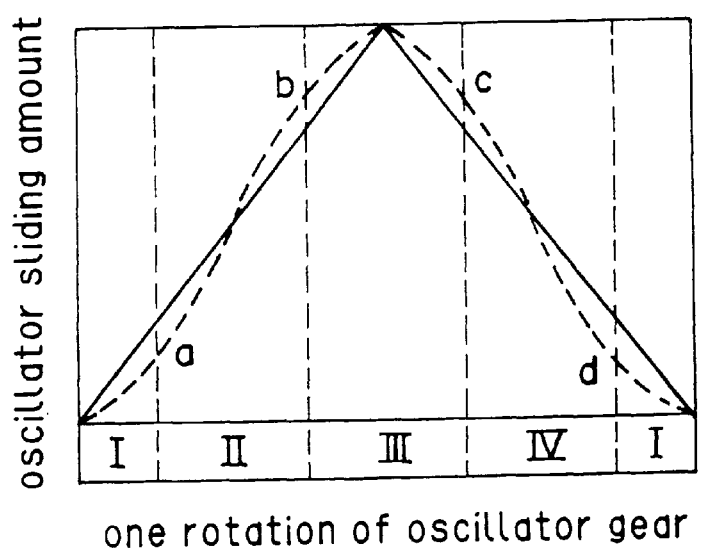
FIG. 43 is a graph showing a relationship between an oscillator sliding amount and a gear rotational angle.

As described above, the oscillator engaged with the second projection 76 approaches a constant motion line shown by the solid line in FIG. 43 per one rotation of the oscillator gear 71. That is, in the high velocity sliding motion area corresponding to a portion in the II quadrant from the point a on the solid line to the point b thereon and a portion from the point c to the point d on the solid line, the oscillator approaches the solid line because of the reduced velocity motion therein, and in the low velocity sliding motion area corresponding to a portion in the IV quadrant from the point b to the point c on the solid line and a portion in the I quadrant from the point d to the point a on the solid line, the oscillator approaches the solid line because of the accelerated velocity motion. Thus, the oscillator can perform the reciprocal motion at a velocity near the constant velocity.

The present invention further includes twenty-second to twenty-sixth embodiments which will be described hereunder with reference to FIGS. 44 to 52.

The present invention further includes twenty-second to twenty-sixth embodiments of spinning reels which will be described hereunder with reference to FIGS. 44 to 52.

Figure 44:
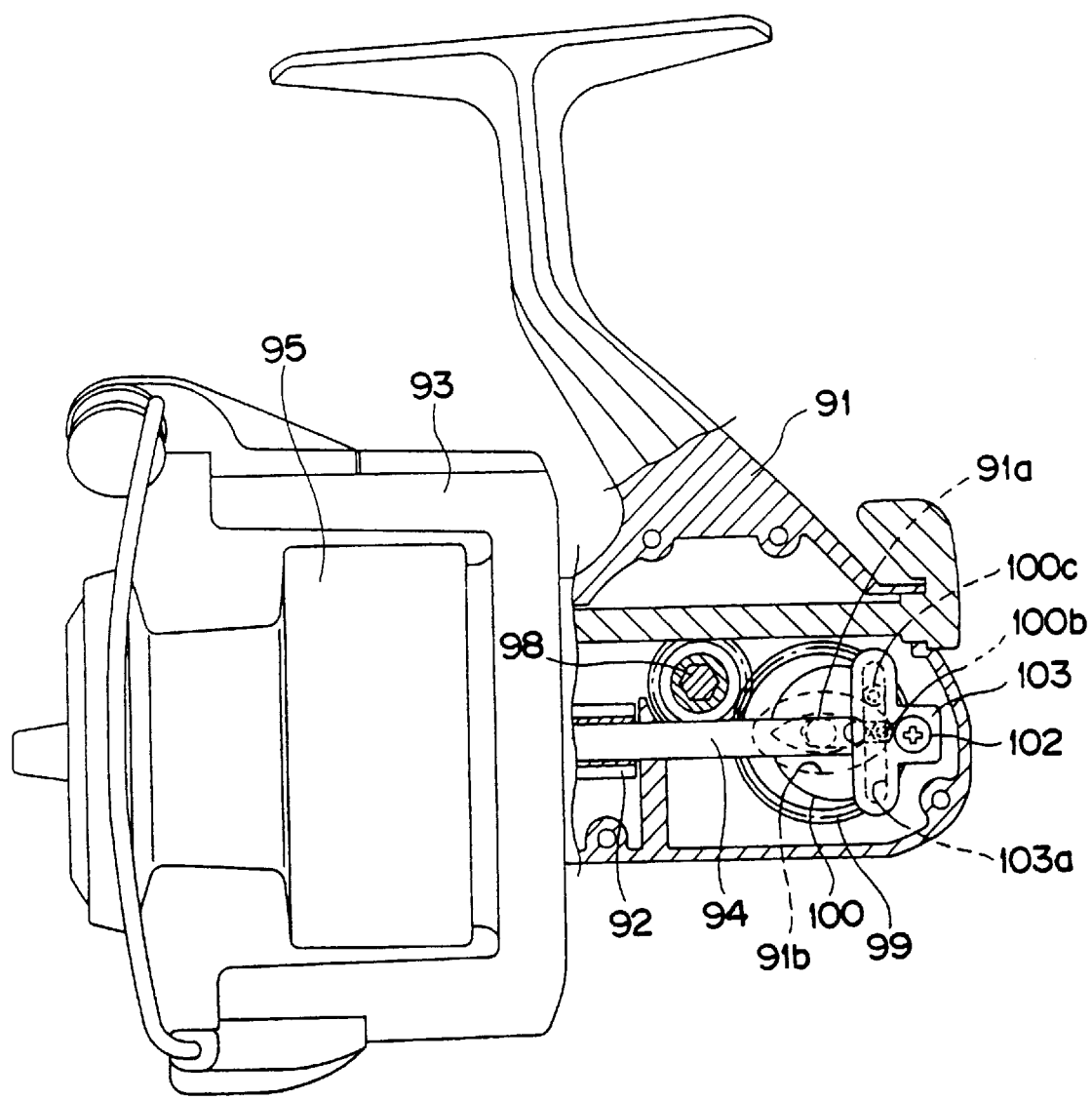
FIG. 44 is a side view, partially in section, of a spinning reel of a twenty-second embodiment of the present invention.

FIG. 44 shows a side view, partially in section, of a spinning reel of the twenty-second embodiment of the present invention, in which reference numeral 91 denotes a reel body or body casing.

Referring to FIG. 44, a cylindrical shaft 92 is mounted to the reel body 91 to be rotatable and a rotational frame 93 is fixed to the cylindrical shaft 92. A spool shaft 94 is inserted into the cylindrical shaft 92 to be movable in its axial direction, and a spool 95 is mounted at the front end portion of the spool shaft 94.

Figure 45:
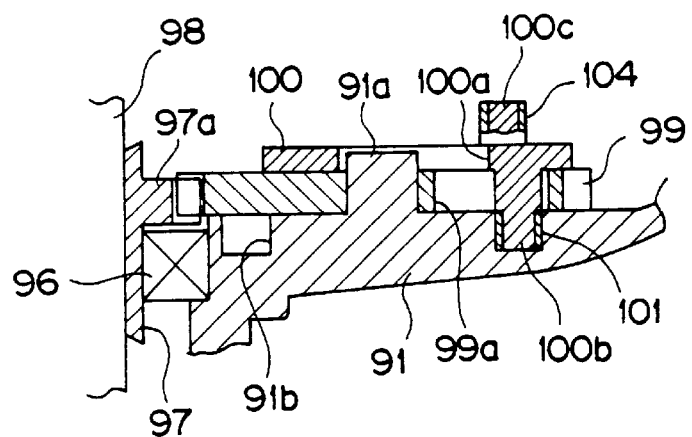
FIG. 45 is a sectional view in an enlarged scale of an important portion of the spinning reel of FIG. 44.

Referring to FIG. 45, a cylindrical shaft 97 is mounted to the reel body 91 so as to be rotatable through a bearing 96, and a handle shaft 98 is inserted into the cylindrical shaft 97. Furthermore, a coupling gear 97a is provided to the cylindrical shaft 97 so as to be engaged with an oscillator gear 99 mounted to a boss 91a of the reel body 91 to be rotatable. A cam groove 91b having an elliptical shape, having a long diameter in the longitudinal direction (bilateral direction in FIG. 45) is formed to the inner surface of the reel body 91. A rotational member 100 is disposed above the oscillator gear 99 as viewed in FIG. 45. The rotational member 100 is formed of a stainless steel stronger than an aluminum which forms the reel body 91. The rotational member 100 is bored with a slot 100a at a suitable portion, into which the boss 91b of the reel body 91 is inserted. The rotational member 100 has a surface, facing the reel body 91, to which a first projection 100b is formed, and the first projection 100b penetrates the slot 99a formed to the oscillator gear 99 and is engaged with the cam groove 91b of the reel body 91.

A collar 101, which is formed of a material, such as polyacetal, having a strength stronger than an aluminum which forms the reel body 91 and having a lubricating ability, is rotatably to the outer periphery of the first projection 100b. Since the collar 101 contacts the cam groove 91b of the reel body 91, the rotational member 100 does not directly contact the cam groove 91b, effectively preventing the cam groove 91b from being worn.

Figure 46:
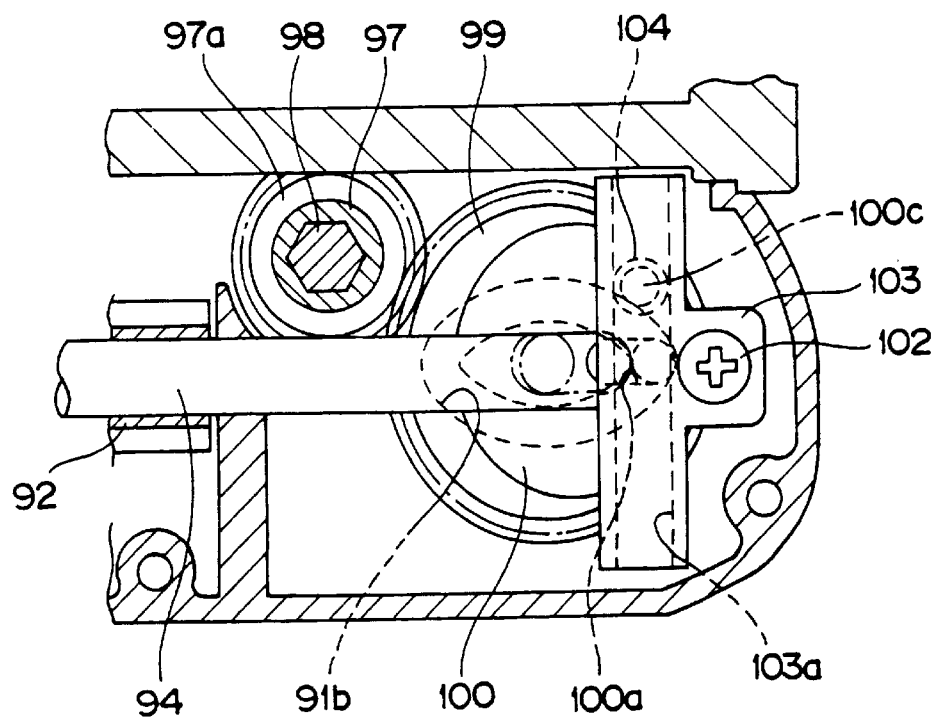
FIG. 46 is a sectional view in an enlarged scale of an important portion of the spinning reel of FIG. 44.

With reference to FIG. 46, the spool shaft 94 has a base end to which an oscillator 103 is fixed by means of vis 102. The oscillator 103 is formed with a long groove 113a extending in a vertical direction as viewed in FIG. 46, and a collar 104 rotatably mounted to a second projection 100c of the rotational member 100 is accommodated in the long groove 103a. The collar 104 is formed of a material, such as polyacetal, having a strength stronger than an aluminum which forms the oscillator 103 and having a lubricating ability. Since the collar 104 contacts the long groove 103a of the oscillator 103, the rotational member 100 does not directly contact the long groove 103a, effectively preventing the long groove 103a from being worn.

The spinning reel of this embodiment of the structure described above will operate as follows.

When a handle lever, not shown, is rotated, the handle shaft 98 is then rotated and the cylindrical shaft 97 is also rotated. According to the rotation of the cylindrical shaft 97, the oscillator gear 99 is hence rotated through the coupling gear 97a formed to the shaft 97. When the oscillator gear 99 is rotated, the first projection 100b is pushed by the inner surface of the long groove 99a and the rotational member 100 is moved. Since the collar 101 of the rotational member 100 is engaged with the cam groove 91b of the reel body 91, the movement thereof is limited and the rotational member 100 is moved smoothly on the cam groove 91b with high lubricating ability. Further, according to the movement of the rotational member 100, the second projection 100c is also moved. However, since the collar 104 formed to the second projection 100c is engaged with the long groove 103a of the oscillator 103, the oscillator 103 can be smoothly moved reciprocally in the bilateral direction, as viewed. Accordingly, the spool 95 can be reciprocally moved through the spool shaft 94 in the bilateral direction as viewed in FIG. 44.

Furthermore, according to the rotation of the handle shaft 98 and the cylindrical shaft 97, the rotational frame 93 is rotated through a master gear, not shown, and the cylindrical shaft 92, and a fishing line, not shown, can be continuously wound up around the spool 95.

During this operation, since the collars 101 and 104 are formed of polyacetal and the reel body 91 and the oscillator 103 are formed of aluminum which is stronger than the polyacetal, the collars 101 and 104 will be worn earlier than the reel body 91 and the oscillator 103 in use. In such case, only the collars 101 and 104 can be exchanged, and the reel body 91 and the oscillator 103 can be prevented from being worn or damaged by the rotational member 100 which is formed of stainless steel which is stronger than the aluminum material, thus improving the maintenance performance.

Further, it is to be noted that, in the above twenty-second embodiment, although the collars 101 and 104 are disposed to be rotatable with respect to the first and second projections 100b and 100c, it is not necessary to be always rotatable and they may be fixed. However, the rotatable structure will attain the smooth operation. In a certain case, one of these collars 101 and 104 may be eliminated.

Figure 47:
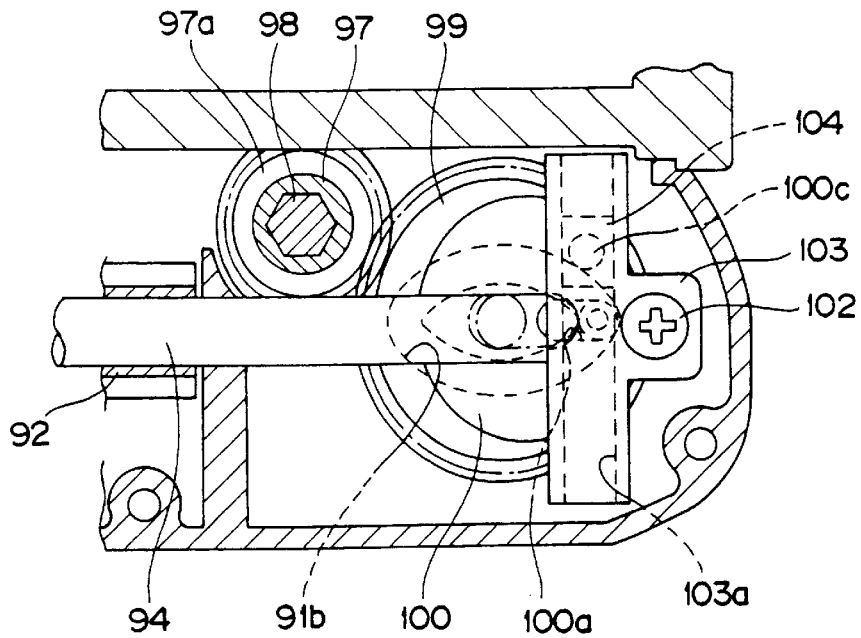
FIG. 47 is a sectional view in an enlarged scale of an important portion of a spinning reel of a twenty-third embodiment of the present invention.

FIG. 47 represents a twenty-third embodiment of a spinning reel of the present invention, in which like reference numerals are added to members or elements corresponding to those of the above twenty-second embodiment and the explanation thereof is omitted herein.

Although, in the former embodiment, the collar 104 has a cylindrical structure having a circular section, in this embodiment, the collar 104 has a cylindrical structure having a rectangular section and the collar 104 is fixed to the second projection 100c. According to this embodiment, since the groove and the collar contact in wide area, the collar hardly wears, and in addition, even in a case where any impact load such as drop-down, the collar 104 is prevented from easily breaking.

Figure 48:
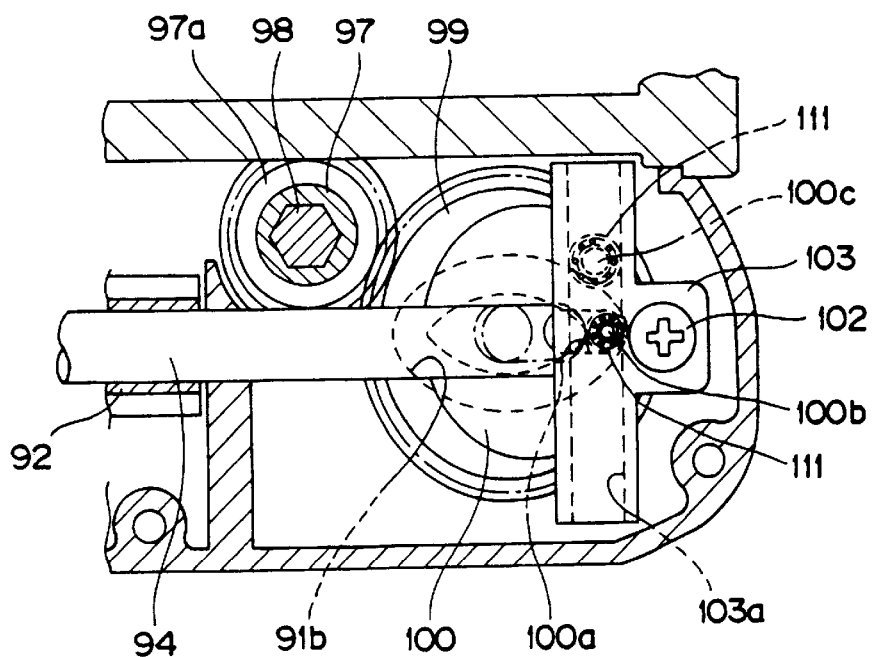
FIG. 48 is a sectional view in an enlarged scale of an important portion of a spinning reel of a twenty-fourth embodiment of the present invention.

FIG. 48 represents a twenty-fourth embodiment of a spinning reel of the present invention, in which like reference numerals are added to members or elements corresponding to those of the above twenty-second embodiment and the explanation thereof is omitted herein.

In this embodiment, ball bearings 111 are used for the collars 101 and 104 in place of those formed of cylindrical members in the former embodiment, and by using the ball bearings 111, the durability can be increased in comparison with the use of the cylindrical members.

Figure 49:
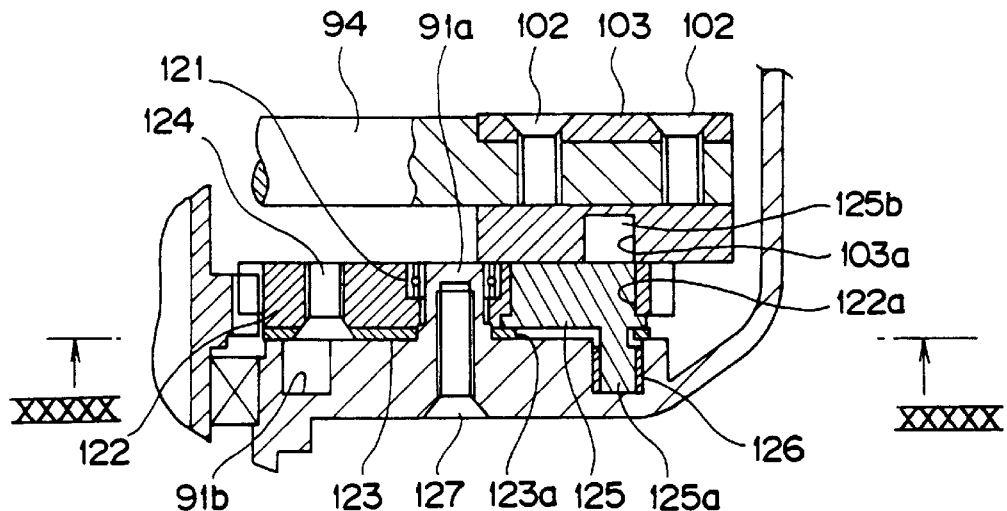
FIG. 49 is a sectional view in an enlarged scale of an important portion of a spinning reel of a twenty-fifth embodiment of the present invention and is a view viewed from a direction XXXXIX—XXXXIX in FIG. 50.
Figure 50:
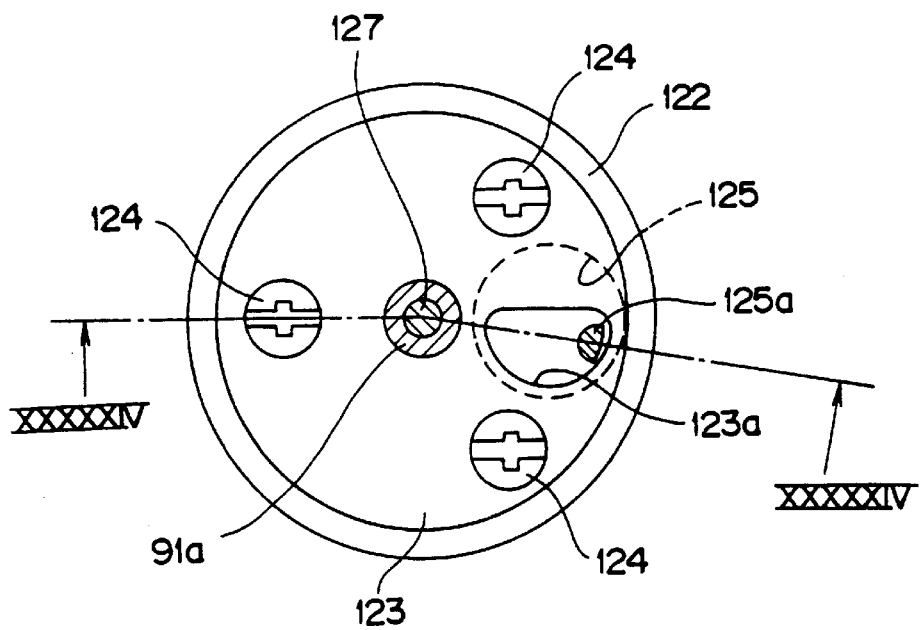
FIG. 50 is a sectional view taken along the line XXXXX—XXXXX in FIG. 49.

FIG. 49 represents a twenty-fifth embodiment of a spinning reel of the present invention and FIG. 50 is a view viewed from a direction XXXXX—XXXXX in FIG. 49, in which like reference numerals are added to members or elements corresponding to those of the above twenty-second embodiment and the explanation thereof is omitted herein.

In this embodiment, an oscillator gear 122 is mounted to be rotatable to the boss 91a of the reel body 91 through a bearing 121, and a plate member 123 is fixed to the oscillator gear 122 by means of vis 124. The oscillator gear 122 is formed with an opening 122a into which a rotational member 125 is inserted to be rotatable. The rotational member 125 is formed with a first projection 125a to which a cylindrical collar 126 is mounted to be rotatable. The collar 126 inserted with the first projection 125a penetrates an escape portion 123a formed to the plate member 123 and is then inserted into the cam groove 91b of the reel body 91 to be movable therein. The rotational member 125 is further formed with a second projection 125b on the side opposite to the first projection 125a and the second projection 125b is inserted into the long groove 103a formed to the oscillator 103 to be movable. A vis 127 is fitted concentrically in the boss 91a of the reel body 91 to improve the mechanical strength of the boss 91a.

As described above, even in the case where the rotational member 125 is rotatably disposed in the oscillator gear 99 by the location of the collar 126, it is damaged or broken before the reel body 91 is damaged, and accordingly, the damage of the reel body 91 can be effectively avoided by easily changing the collar 126 before the reel body 91 is damaged, resulting in the improvement of the durability of the spinning reel itself.

In the foregoing embodiments, although the collar is mounted only to the first projection 125a of the rotational member 125, the collar may be also mounted only to the second projection 125b or the collar may be also mounted only to the second projection 125b without being mounted to the first projection 125a.

Figure 51:
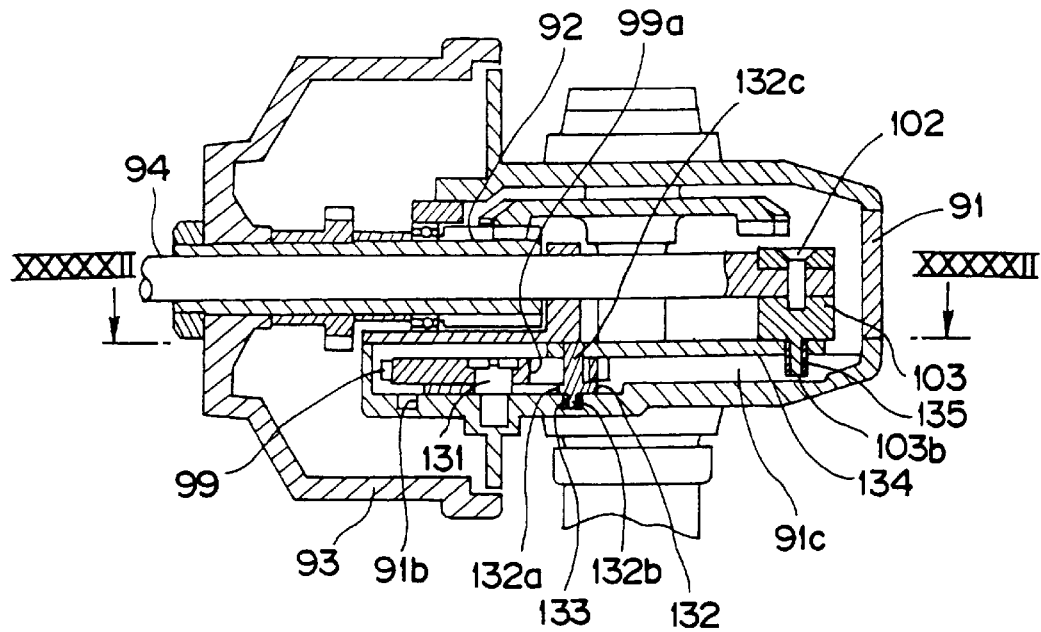
FIG. 51 is a sectional view in an enlarged scale of an important portion of a spinning reel of a twenty-sixth embodiment of the present invention.
Figure 52:
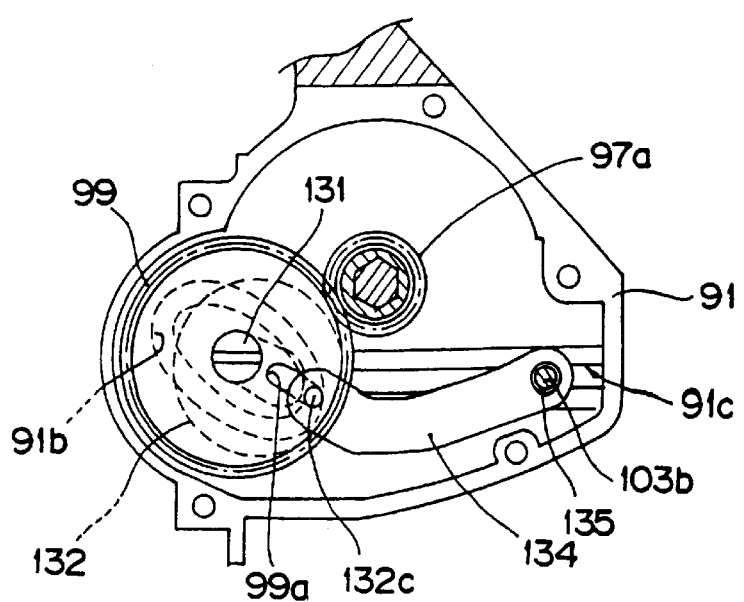
FIG. 52 is a sectional view taken along the line XXXXXII—XXXXXII in FIG. 51.

FIG. 51 represents a twenty-sixth embodiment of a spinning reel of the present invention and FIG. 52 is a view viewed from a direction XXXXXII—XXXXXII in FIG. 51, in which like reference numerals are added to members or elements corresponding to those of the embodiments and the explanation thereof is omitted herein.

In this twenty-sixth embodiment, the oscillator gear 99 and a rotational member 132 are rotatably mounted to the reel body 91 to be rotatable by means of vis 131, which penetrates a slot 132a formed to the rotational member 132. The rotational member 132 has a side surface, opposite to the reel body, to which a first projection 132b is formed, and a collar 133 formed of a material softer than that of the reel body 91 is rotatably mounted to the outer peripheral surface of the first projection 132b. The collar 133 is inserted into the cam groove 91b formed to the reel body 91. Furthermore, a second projection 132c is formed to the surface of the rotational member 132 opposite to the surface thereof on which the first projection 132b is formed so as to penetrate the slot 99a formed to the oscillator gear 99, and one end of a link 134 is pivoted to the second projection 132c. A third projection 103b is formed to the oscillator 103 and a collar 135 is mounted to the outer periphery of the third projection 103b. The collar 135 penetrates the other end of the link 134 and engaged with the guide groove 91c formed to the reel body 91 and extending in the longitudinal direction thereof.

According to the above structure, when the oscillator gear 99 is rotated, the rotational member 132 is rotated in a manner limited by the cam groove 91b. When the rotational member 132 is rotated, the right end portion, as viewed, of the link 134 pivoted to the second projection 132c is moved reciprocally in the longitudinal direction (bilateral direction in FIG. 52) in the manner limited by the guide groove 91c and, then, the spool shaft 94 is moved reciprocally through the oscillator 103.

During such operation, since the collars 133 and 135 are formed of a material softer than that of the reel body 91, the collars 133 and 135 may be first worn before the reel body 91 is damaged. However, the damage of the reel body 91 will be effectively avoided by easily repairing or exchanging the collars before the reel body 91 is damaged, resulting in the improvement of the durability of the spinning reel itself.

Further, in the foregoing embodiments, although the collars are formed of a material of polyacetal, the material is not limited to the polyacetal and nylon, polyvinyl chloride may be used.

It is to be noted that the present invention is not limited to the described embodiments and many other changes, modifications and combinations may be made without departing from the scopes of the appended claims.

What is claimed is:

1. A spinning reel comprising:

a reel body casing;

a rotational frame member mounted on the reel body casing so as to be rotatable by means of a handle means supported on the reel body casing;

a spool shaft slidably mounted on the rotational frame member;

a spool secured to one end portion of the spool shaft;

an oscillator means secured to another end portion of the spool shaft;

an oscillator gear mounted on the reel body casing so as to be rotatable by said handle means; and a rotational member being rotatable together with said oscillator gear and movable relative to said oscillator gear, said rotational member being provided with a first projection engaging with a cam groove having a substantially elliptical shape, which is formed on an inner surface of the reel body casing, which faces the oscillator gear and with a second projection being connected with said oscillator means, and said first projection having a central axis shifted from a central axis of said second projection, the largest dimension of said rotational member being greater than the distance between the central axis of said second projection and the central axis of said oscillator gear, movement of said first projection along said cam groove, which is caused by rotation of said oscillator gear, causing said rotational member to move relative to said oscillator gear.

2. A spinning reel according to claim 1, wherein a slot extending in a diametrical direction of said oscillator gear is provided on any one of said rotational member and said oscillator gear;

an engaging portion is provided on an other of said rotational member and said oscillator gear, said engaging portion engaging with said slot; and the movement of said first projection along said cam groove causes said rotational member to slide in the diametrical direction of said oscillator gear.

3. A spinning reel according to claim 2, wherein said first projection is shifted from said second projection by a prescribed central angle of said oscillator gear, and said cam groove has a major axis crossing a line, which is in parallel with a direction of motion of said spool shaft.

4. A spinning reel according to claim 2, wherein said oscillator means is provided with a vertical groove and said second projection is engageable with said vertical groove.

* * * * *